(12) United States Patent
Jansen

(10) Patent No.: US 6,855,016 B1
(45) Date of Patent: Feb. 15, 2005

(54) ELECTRIC WATERCYCLE WITH VARIABLE ELECTRONIC GEARING AND HUMAN POWER AMPLIFICATION

(76) Inventor: Patrick Lee Jansen, 1 Second St., Alplaus, NY (US) 12008

( * ) Notice: Subject to any disclaimer, the term of this patent is extended or adjusted under 35 U.S.C. 154(b) by 0 days.

(21) Appl. No.: 10/617,155

(22) Filed: Jul. 10, 2003

Related U.S. Application Data
(60) Provisional application No. 60/396,057, filed on Jul. 16, 2002.

(51) Int. Cl.[7] .................................................. B60L 11/02
(52) U.S. Cl. ............................................. 440/6; 440/27
(58) Field of Search ...................................... 440/26–30

(56) References Cited

U.S. PATENT DOCUMENTS

| | | |
|---|---|---|
| 5,088,944 A | 2/1992 | Kats |
| 5,217,398 A | 6/1993 | Meron et al. |
| 5,362,264 A | 11/1994 | Parant |
| 5,722,865 A | 3/1998 | Tatum |
| 6,217,398 B1 | 4/2001 | Davis |

*Primary Examiner*—Jesus D. Sotelo

(57) ABSTRACT

A watercraft incorporating electrical power generation from human kinetic power, and electrical energy storage to enable amplification of human-power to propulsion power to achieve increased watercraft speeds. Control electronics enable operator-adjustable variable electronic gearing, and an assortment of torque vs. speed loading characteristics of the generator, thereby providing optimal pedal cadences and enjoyment for a wide variety of operators. An optional photovoltaic solar panel augments the power generation to extend travel time with power amplification, and recharges the energy storage system. This invention provides a pleasure watercraft that is simultaneously lightweight, low cost, low maintenance, environmentally friendly with zero pollution, ultra-low noise, and thrilling to operate, while simultaneously providing a means of enjoyable exercise for operators of nearly all abilities.

25 Claims, 14 Drawing Sheets

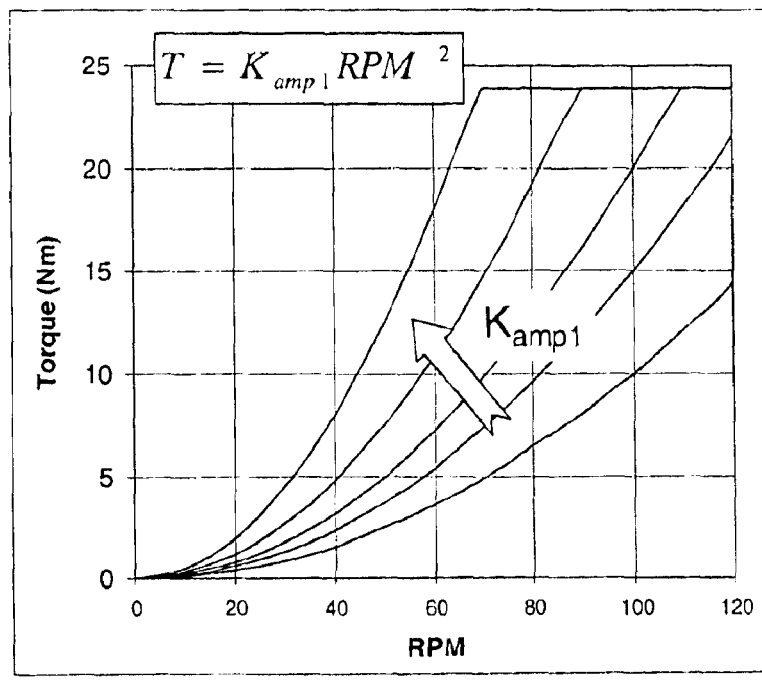
FIG. 7-A
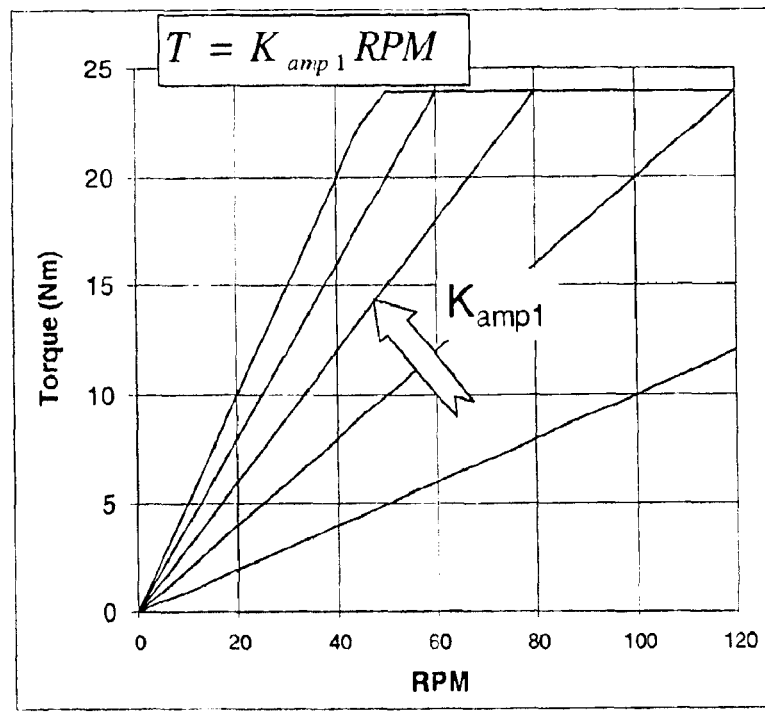
FIG. 7-B

ELECTRIC WATERCYCLE WITH VARIABLE ELECTRONIC GEARING AND HUMAN POWER AMPLIFICATION

CROSS-REFERENCE TO RELATED APPLICATION

This application claims the benefit of Provisional Patent Application Ser. No. 60/396,057 filed Jul. 16, 2002.

FEDERALLY SPONSORED RESEARCH

Not Applicable

SEQUENCE LISTING OR PROGRAM

Not Applicable

BACKGROUND

1. Field of Invention

The present invention relates to the general art of watercraft, and to the particular field of hybrid-electric powered watercraft incorporating manual (pedal, human) power with electric power amplification via electric battery storage and solar energy coupled via control electronics.

2. Description of Prior Art

A multitude of pedal-powered watercraft (also referred to as water bikes, water-bicycles, and watercycles) are commercially available. They are relatively low cost, low maintenance, light weight, and fun. Their main drawback is the relatively low power output capability of the operators. Unlike watercraft propelled by conventional combustion engines, pedal-powered watercraft are severely limited in power capability; typically less than 200 watts (around ¼ hp) per person on a continuous basis. A cyclist in good condition can generate around 200 watts at a preferred cadence of around 90–100 RPM. Many people of lesser abilities may be only capable of generating around 100 watts in a continuous comfortable manner. Thus maximizing the overall efficiency of the watercraft, including its propulsion system, as it travels in water is vitally important to maximize speed and travel distance capabilities. To maximize the speed (and pedaling efficiency), many of the newer watercycles such as the Seacycle® and Waterbike® manufactured by the Meyers Boat Company, Inc., are designed to be as light-weight with efficient long and narrow hulls.

The patented prior art has included numerous designs of pedal-powered watercraft. However, many of the recent inventions have had the primary object to improve transportability by car. For example:

U.S. Pat. No. 5,088,944 (Kats) discloses a collapsible water bike consisting of two pontoons and driven by a pedal assembly connected to a propeller via a gear unit. A handlebar connected to a rudder provided steering. The object was to enable ease of transportation without need of special tools or transporting vehicle such as a truck.

U.S. Pat. No. 5,217,398 (Meron et al) discloses a pedal operated catamaran, including an elongated, longitudinal drive shaft connected to a propeller. A gear train transmits power from the pedal crankshaft to the propeller drive shaft. A latching mechanism allows on-the-fly adjustment of the propeller position, thereby facilitating car top carrying of the watercraft without disassembly, and adjusting for varying water conditions.

U.S. Pat. No. 5,362,264 (Parant) discloses a water-bicycle comprising an elongated flotation board, and an easily detachable propulsion and seat unit, with the propeller unit passing through the board. A detachable handlebar connected to a rudder also passes through the board and enables steering.

Pedal-powered watercraft designs tend to be the result of a compromise between the conflicting objectives of weight, cost, seaworthiness, transportability, comfort, and speed.

U.S. Pat. No. 5,722,865 (Tatum) discloses a canard balanced marine bicycle that significantly improves upon the weight and speed vs. seaworthiness compromise. The canard provides dynamic stability enabling the watercraft to have a single long, slender lightweight hull, thereby improving the efficiency, and resulting speed, in the water. However, the propulsion power, and hence, ultimate speed and travel distance, is still limited by the capabilities of the individual rider.

U.S. Pat. No. 6,217,398 B1 (Davis) discloses a human-powered or human-assisted energy generation and transmission system with energy storage means and improved efficiency. The generation and transmission system is intended to be an improvement over conventional mechanical systems, such as pedal-powered systems comprising chains and sprockets, by controlling the energy output to be constant, independent of the pedal position, thereby claiming to improve the overall efficiency. Over a typical pedal cycle, the power produced by a human varies substantially with pedal position. According to the Davis invention, energy storage is used to supplement the human power during the portion of the pedaling cycle that is least efficient. This portion of the pedal cycle is determined by sensors detecting the pedal position during rotation. The supplemental energy is extracted from the energy generated during the portion of the pedaling cycle that is most efficient, such that the average energy generated and used for propulsion is not increased, apart from potential claimed efficiency improvements. The generation and transmission system consists of electric generators, motors, energy storage, controllers, and sensors, without mechanical linkages. The intended applications are human-powered or human-assisted vehicles of all types, including bicycles, watercraft, aircraft, hydrofoils, and hovercraft.

Numerous all-electric pleasure watercraft are also commercially available. These watercraft typically contain lead-acid battery storage and DC electric motor propulsion. Electric trolling motors are commonly used for the electric motor propulsion units. The primary limitations of these electric watercraft are finite range and speed.

Objects and Advantages

The object of the invention is to provide a pleasure watercraft that is simultaneously lightweight, low cost, environmentally friendly with zero pollution, ultra-low noise, and thrilling to operate, while simultaneously providing an optional means of enjoyable exercise for operators of all abilities. A person that routinely pedals a conventional watercycle on a specific lake or river is likely to see only the same limited area each time, due to the severely restricted speed, and hence, travel distance possible within a finite amount of exercise time. This can lead to boredom rapidly. Thus one objective of the present invention is to provide a new type of watercycle employing a human power-amplification means via energy storage to substantially increase the speed and range of the watercraft.

This invention combines human-power and electric-power watercraft technologies into one watercraft, and by adding new innovative controls, the best of both types of watercraft is obtained. With this invention, the fit cyclist that routinely exercises, as well as the occasional rider, can explore a much larger area of a bay, lake or river, in a shorter amount of time, thereby increasing enjoyment considerably. Unlike battery-only electric watercraft, this invention removes the worry of running out of battery power, or solar power on a cloudy day or night., If the batteries become drained, and solar power is not available, the operator can still pedal back to shore, though at reduced power. Diagnostic displays that monitor the usable stored energy of the battery, as well as the generated solar power and pedal power, keep the operator informed, so that the operator can wisely return to shore under full power, if desired, prior to battery depletion.

Another objective of the present invention is to provide a watercraft comprising a widely variable electronic gearing ratio, enabling the operator to independently set the pedaling cadence and power level, thereby maximizing the efficiency and comfort of the operator.

It is another objective of the present invention to provide a watercraft comprising human power-amplification and variable electronic gearing ratio, thereby permitting operators of differing physical abilities and goals to simultaneously operate one or more of the watercraft over the same distance at the same speed, thereby sharing the experience, while still exercising at their individually preferred effort levels.

It is another objective of the present invention to provide a dual-seated watercraft comprising dual systems of human power-amplification and variable electronic gearing ratio, thereby permitting operators of differing physical abilities and goals to simultaneously operate the same watercraft while each independently achieving their desired level of physical exercise, without sacrificing the overall speed or travel distance of the watercraft.

It is still another objective of the present invention to provide a watercraft comprising operator-selectable pedal torque vs. pedal cadence characteristics, such as simulated rolling hills, a simulated mechanically-coupled water propeller, or a simple linear characteristics, to add an additional degree of enjoyment and pedaling comfort to the operator. Such flexibility is not possible with pure mechanically-driven systems, such as prior art waterbikes.

Yet another objective of the present invention is to provide a watercraft employing a human power-amplification means via energy storage with photovoltaic power to recharge the energy storage, thereby providing a pollution-free watercraft.

Yet another objective of the present invention is to provide a watercraft employing a human power-amplification means via energy storage with photovoltaic power to enable increased travel speed and range when the energy storage system is depleted.

Yet another objective of the present invention is to provide an electric watercraft that can be optionally operated solely from stored energy or on-board photovoltaic power.

SUMMARY

The present invention relates to a hybrid electric watercraft for personal enjoyment that incorporates human power with electric battery storage and solar power in an innovative new method. There are numerous modes of operation, the most innovative being the "human power amplification" mode whereby the power put forth by the occupant(s) via pedaling or hand-cranking is electronically amplified and converted into increased propulsive thrust for increasing the watercraft speed, thereby increasing the occupant(s)'s enjoyment. The second key innovation is the infinitely adjustable electronic gearing and variable torque vs. pedal cadence characteristics achieved by pedal generator(s).

The watercraft of the invention comprises a generation means comprising at least one electric generator that converts human kinetic energy to electrical energy, a propulsion means comprising of at least one electric motor and at least one apparatus for converting the motor torque to propelling thrust, an energy storage means configured to receive and store electrical energy, and further configured to supply electrical energy to the said electric motor, a first control means to control the loading characteristics of the said generator, and a second control means to control the electrical power supplied to the said electric motor as a function of a load point of the said generator.

DRAWINGS

Drawing Figures

FIG. 7-A is a chart illustrating the pedal generator load characteristics featuring effective variable electronic gearing provided by the pedal generator and controls with a mapping profile proportional to RPM squared.

FIG. 7-B is a chart illustrating the pedal generator load characteristics featuring the effective variable electronic gearing provided by the pedal generator and controls with a mapping profile proportional to RPM.

Figure 8:
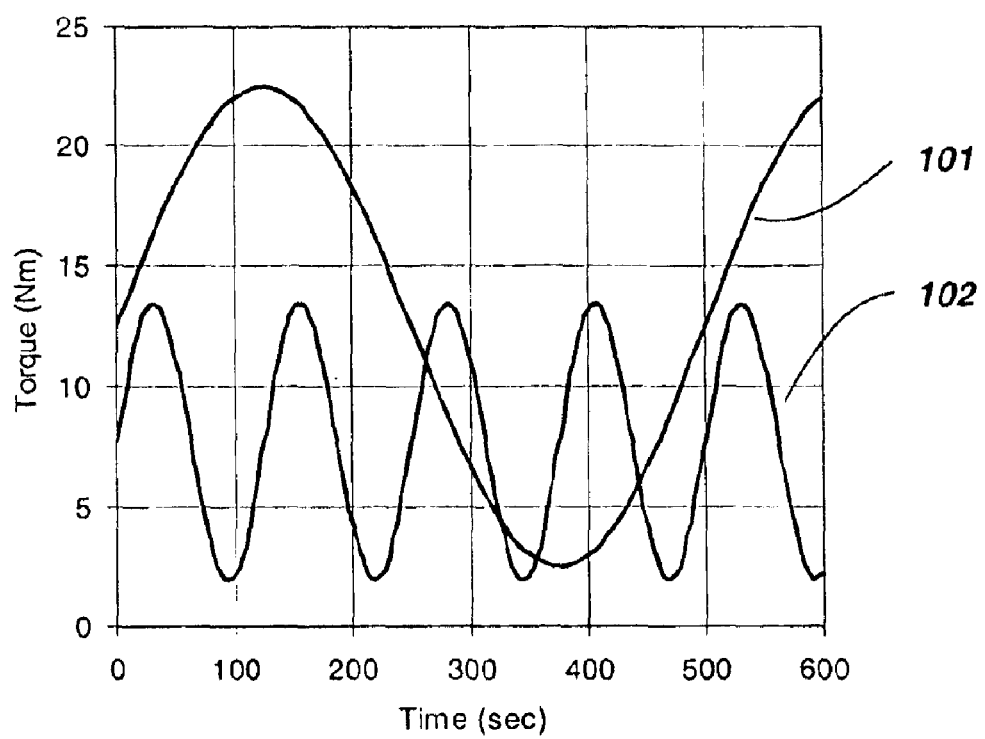

FIG. 8 is a chart illustrating the pedal generator load characteristics as a function of time for two different settings with an example mapping profile designed to simulate traveling through hills and valleys.

Figure 9:
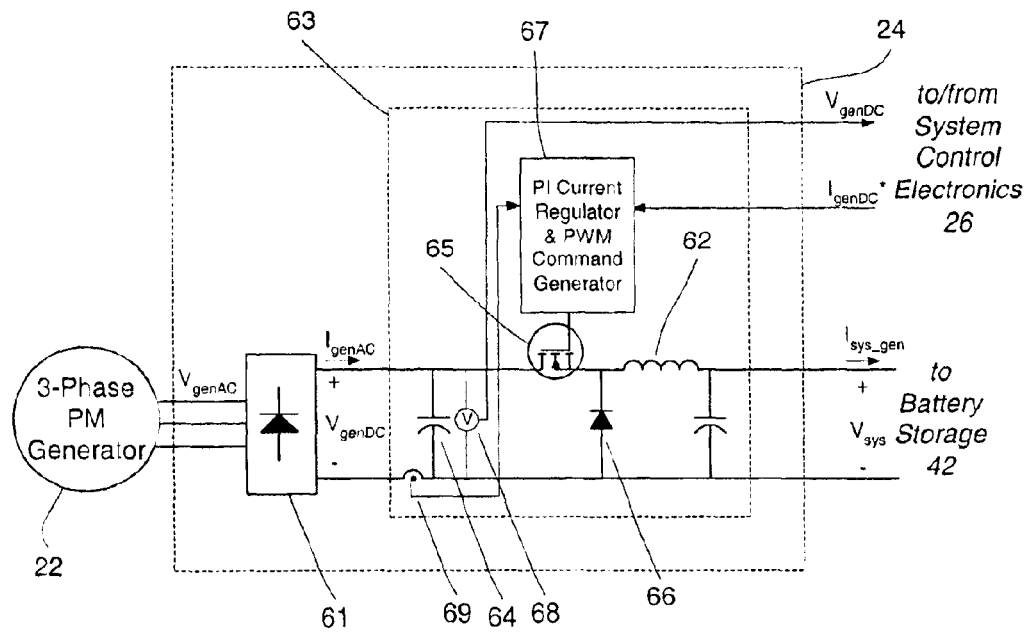

FIG. 9 illustrates the preferred embodiment of the electric system for the pedal control electronics consisting of a diode bridge rectifier and a current-regulated buck converter.

Figure 10:
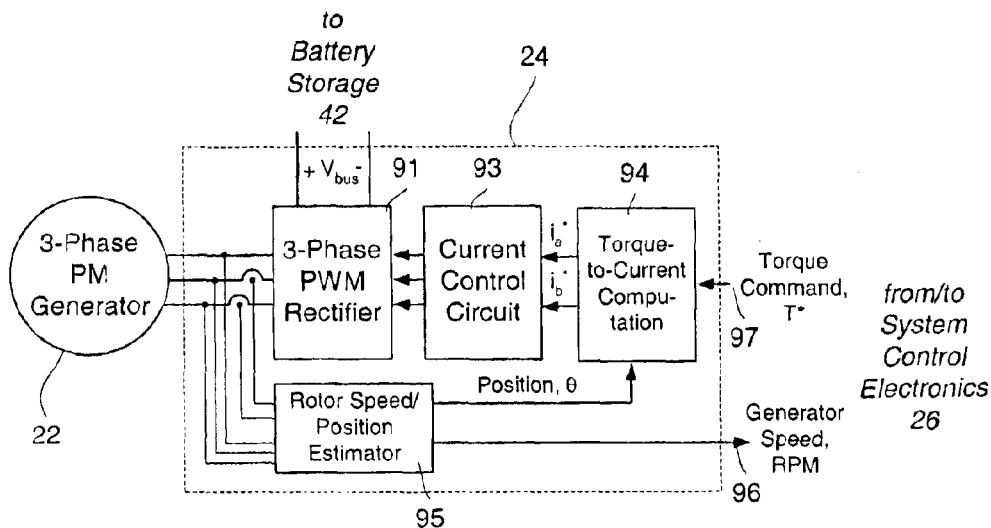

FIG. 10 illustrates one embodiment of the electric system for the pedal control electronics consisting of a torque-controlled PWM active rectifier and generator speed estimator.

Figure 11:
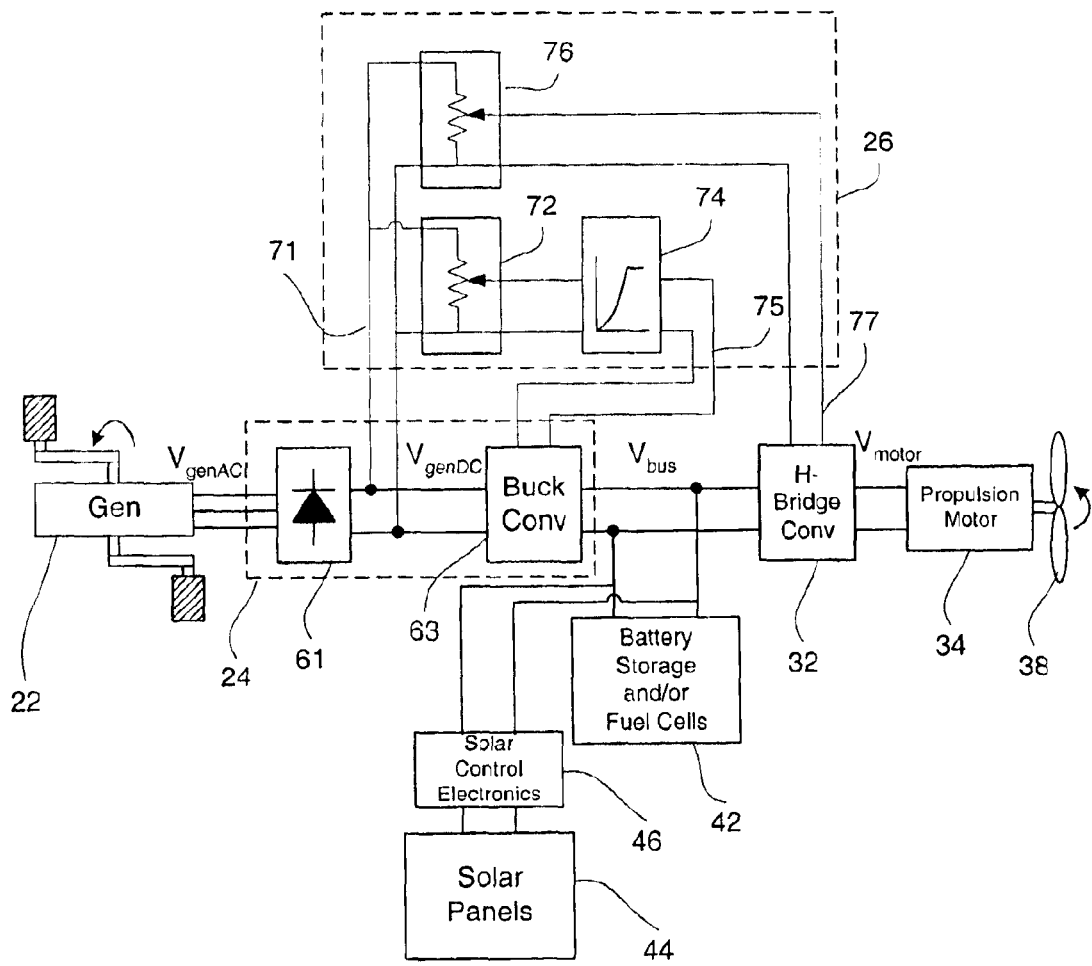

FIG. 11 illustrates a simple system controller for the electric system for the embodiment with one operator and one propulsion motor unit.

Figure 12:
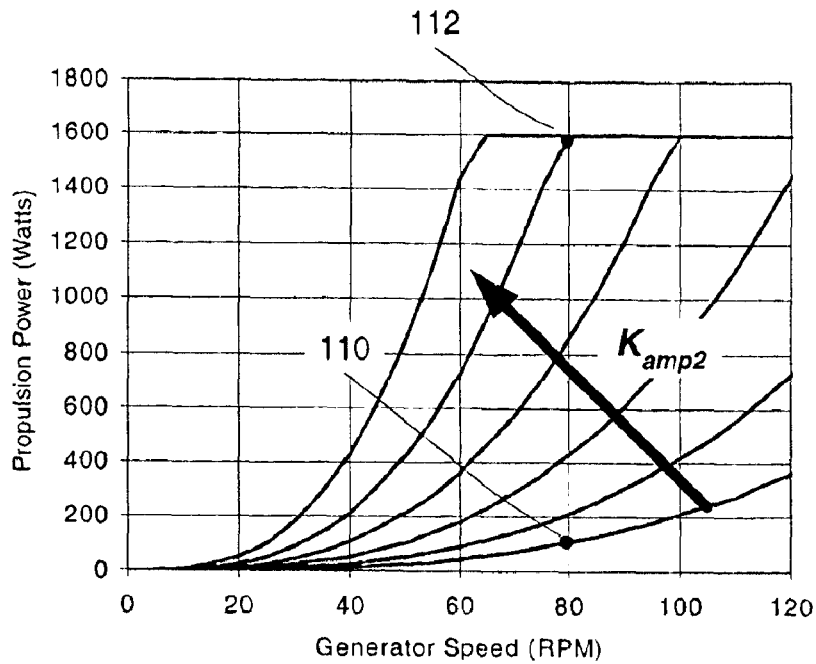

FIG. 12 is a chart illustrating propulsion power as a function of pedal generator speed for increasing power amplification gain for an example embodiment.

Figure 13:
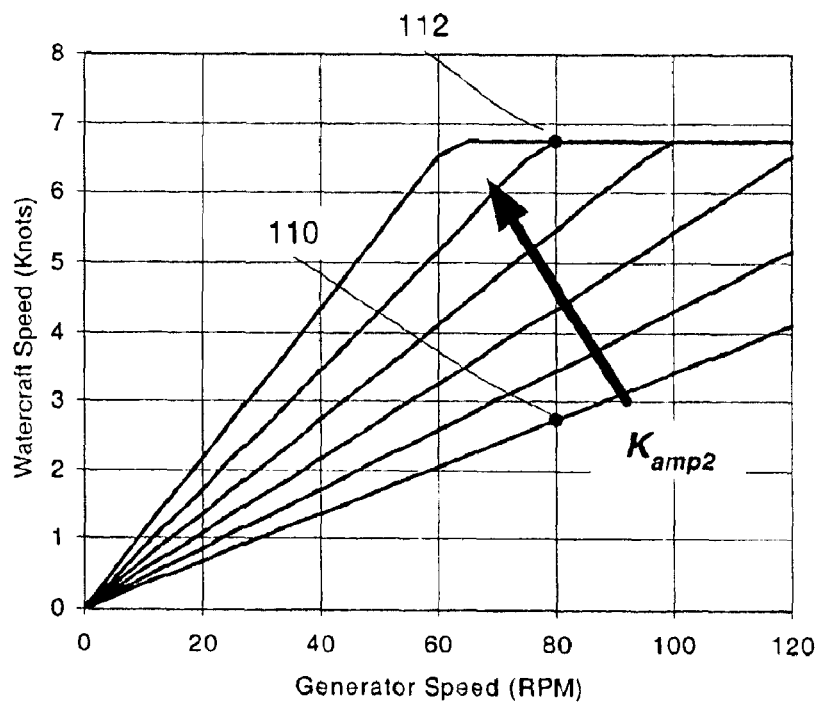

FIG. 13 is a chart illustrating watercraft speed as a function of pedal generator speed for increasing power amplification gain for an example embodiment.

Figure 14:
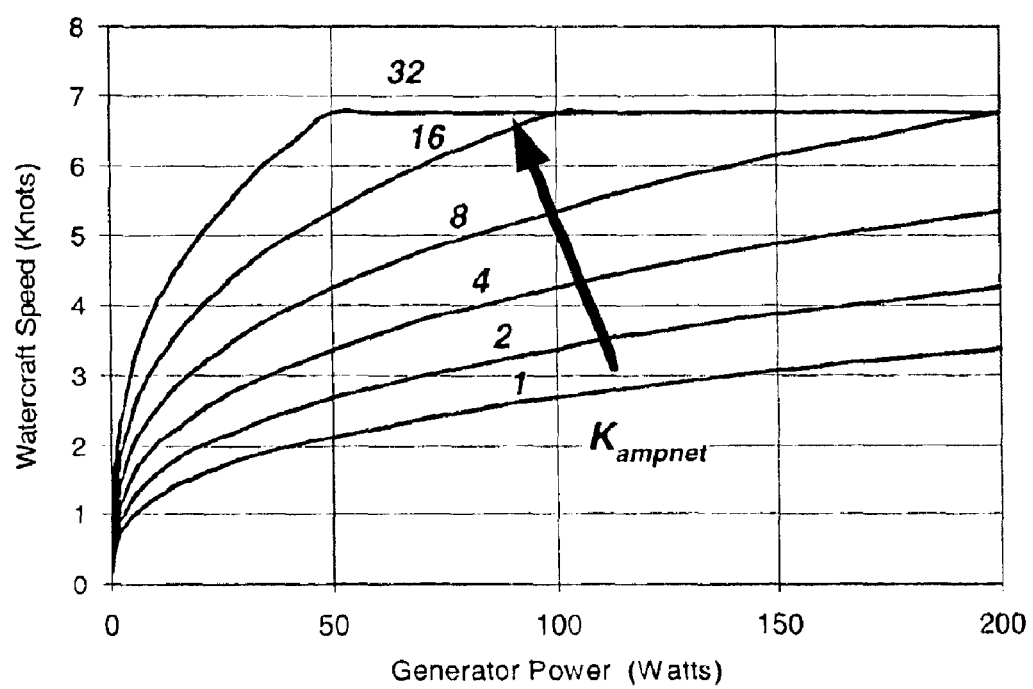

FIG. 14 is a chart illustrating watercraft speed as a function of pedal generator power for increasing net power amplification gain for an example embodiment.

Figure 15:
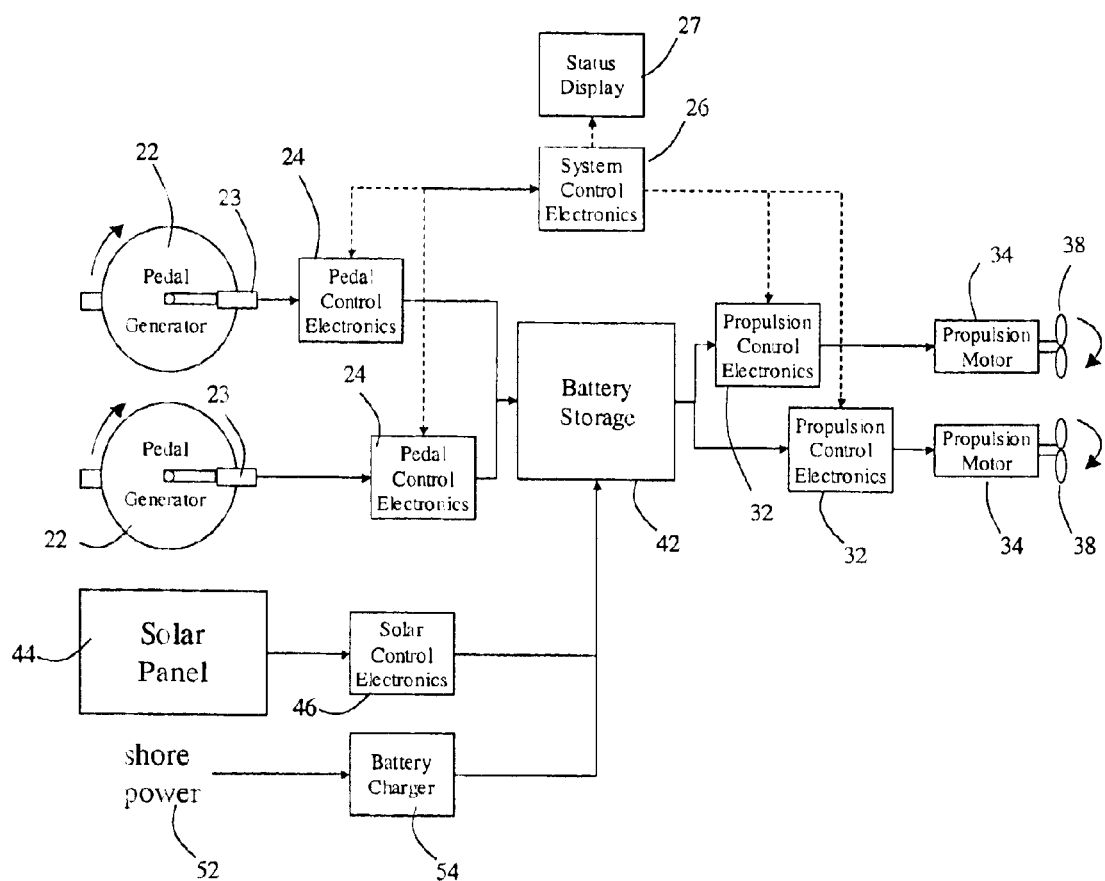

FIG. 15 is a block diagram illustration of the electric system with power amplification of the embodiment of the invention designed for two operators and two propulsion motor units.

Figure 16:
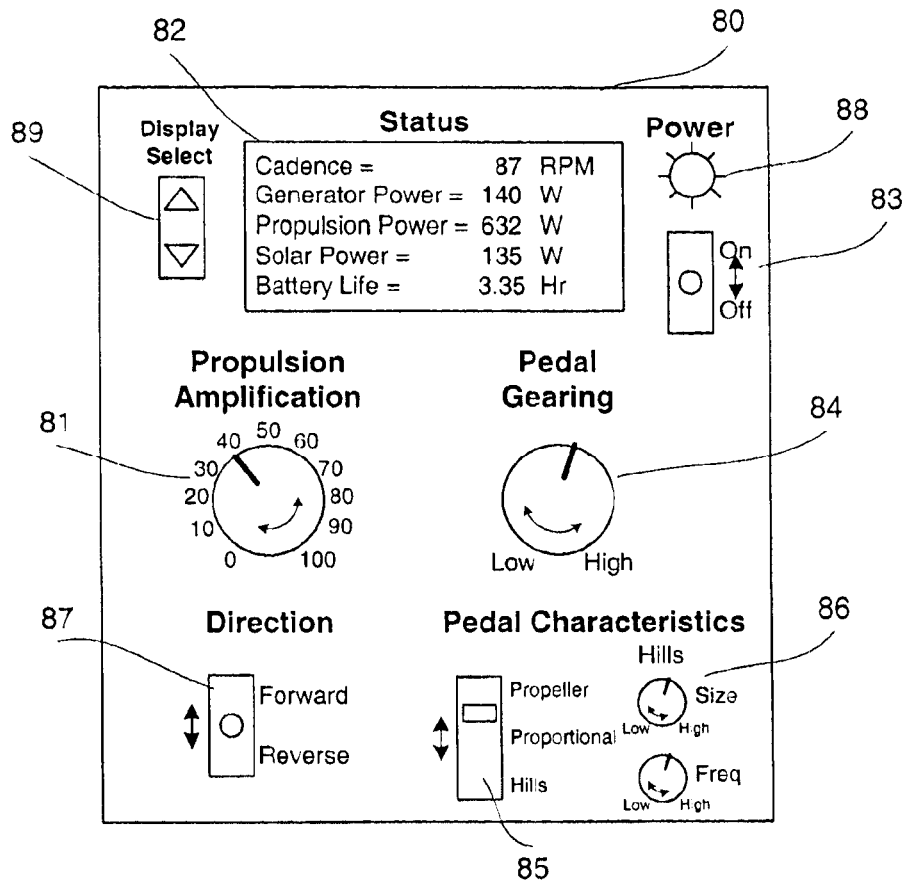

FIG. 16 illustrates the operator control panel for the single-operator embodiment of the watercraft invention.

Figure 17:
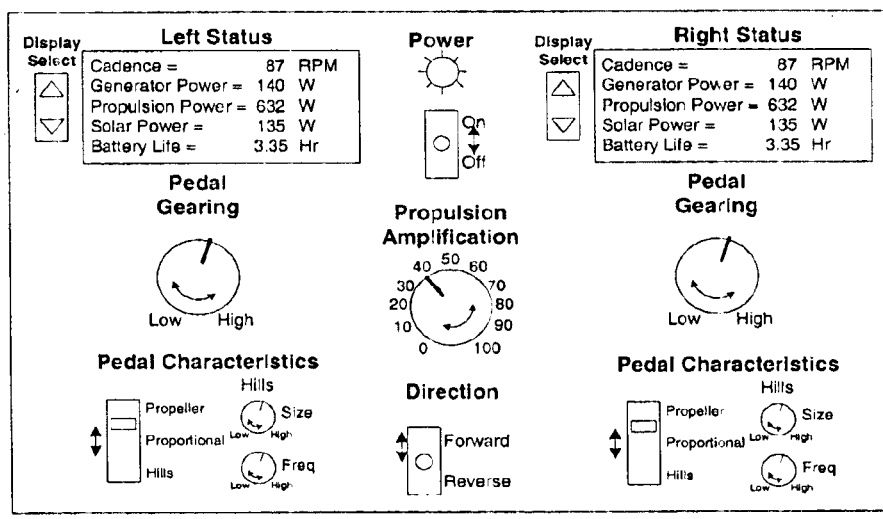

FIG. 17 illustrates the operator control panel for the two-operator embodiment of the watercraft invention.

REFERENCE NUMERALS IN DRAWINGS 1 watercraft invention
2 hull of watercraft invention
3 outriggers
4 strut members
5 watercraft flooring/splash guard
7 seat
22 electric pedal generator
23 foot pedals
24 pedal generator control electronics unit
26 system control electronics unit
27 status display
28 operator control unit containing status display and control electronics
29 operator control unit containing steering and optional thrust controls
32 propulsion motor control electronics
33 electric propulsion unit
34 electric propulsion motor
35 duct (shroud) surrounding motor and propeller
38 propeller
39 rudder
42 batteries/battery storage
43 compartment containing batteries and control electronics
44 photovoltaic solar panel
46 photovoltaic solar panel control electronics
52 shore power
54 battery charger using shore power
61 diode bridge rectifier in generator control electronics unit
62 low-side inductor in buck converter
63 current-regulated buck converter in generator control electronics unit
64 high-side capacitor in buck converter
65 MOSFET in buck converter
66 freewheeling diode in buck converter
67 current regulator and PWM generator block
68 high-side (rectified generator) voltage sensor
69 high-side (rectified generator) current sensor
71 signal wires
72 $K_{amp1}$ potentiometer with output proportional to generator voltage
74 mapping function
75 generator load control signal wires
76 $K_{amp2}$ potentiometer with output proportional to generator voltage
77 propulsion amplification signal wires
80 operator-operated control interface
81 control knob for propulsion amplification potentiometer, Kamp2
82 LCD status display
83 power switch
84 control knob for pedal generator gear ratio potentiometer, Kamp1
85 pedal generator torque vs speed mapping selection switch
86 simulated hill-mode mapping characteristic adjusters (potentiometers)
87 forward/reverse switch
88 power indicator LED
89 display select switch
90 torque-controlled active rectifier
91 three-phase PWM active rectifier
93 current control circuit
94 torque-to-current computation unit
95 rotor speed and position estimator
96 generator speed estimate
97 generator torque command
101 curve illustrating pedal torque for large slow varying hills & valleys
102 curve illustrating pedal torque for small fast varying hills & valleys
110 operating point at 80 RPM and low $K_{amp2}$ gain
112 operating point at 80 RPM and high $K_{amp2}$ gain

DESCRIPTION

Description and Operation

Figure 1:
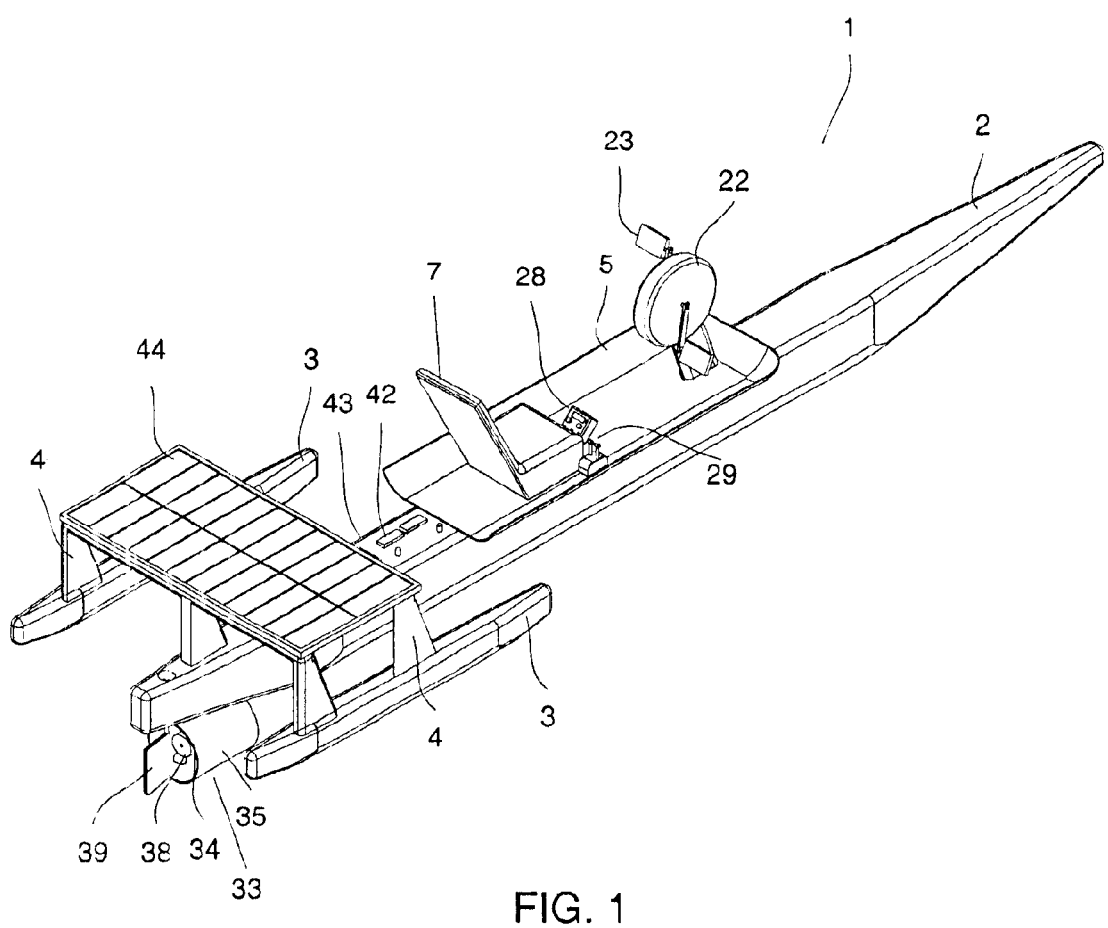
FIG. 1 is a rear perspective view of a single-hull embodiment of the watercraft invention for one operator with optional solar panel.
Figure 2:
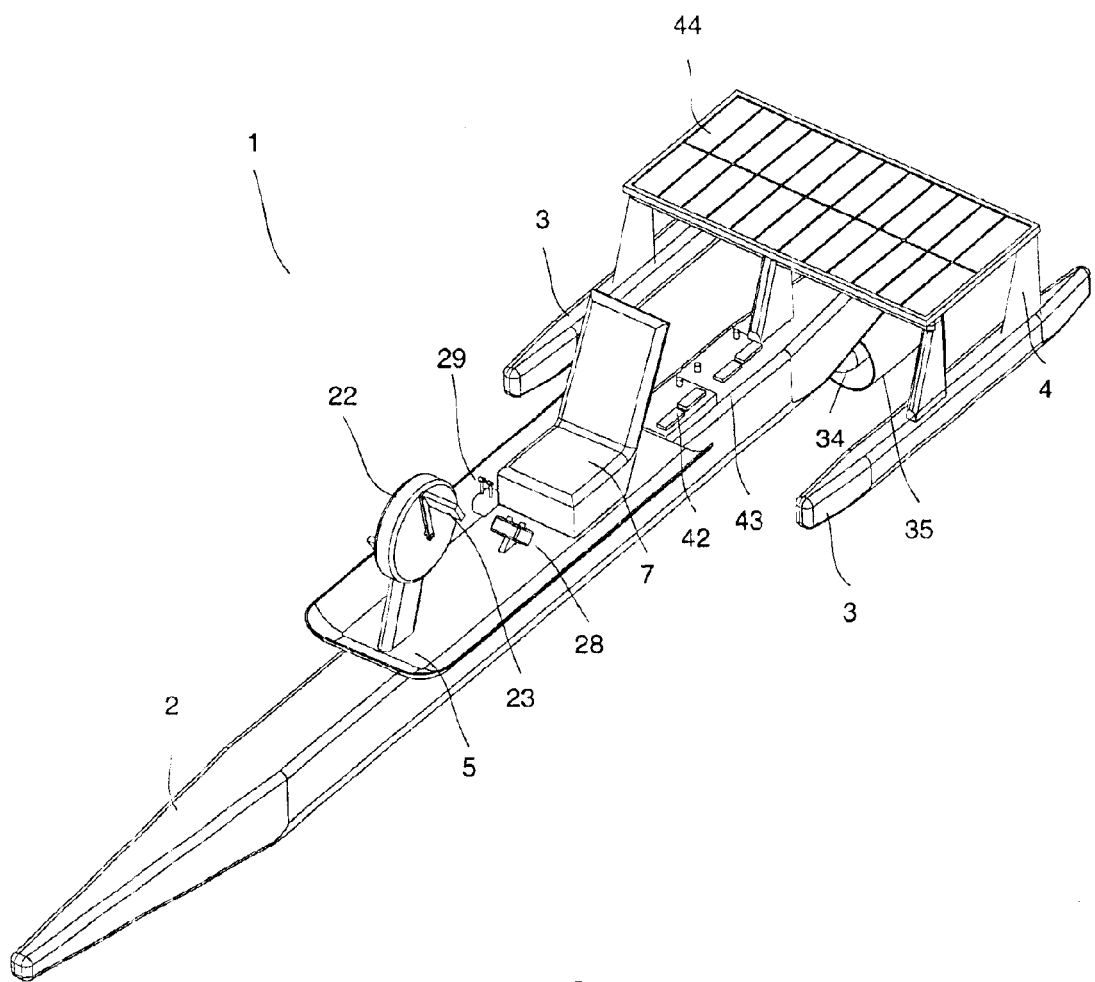
FIG. 2 is a front perspective view of a single-hull embodiment of the watercraft invention for one operator with optional solar panel.
Figure 3:
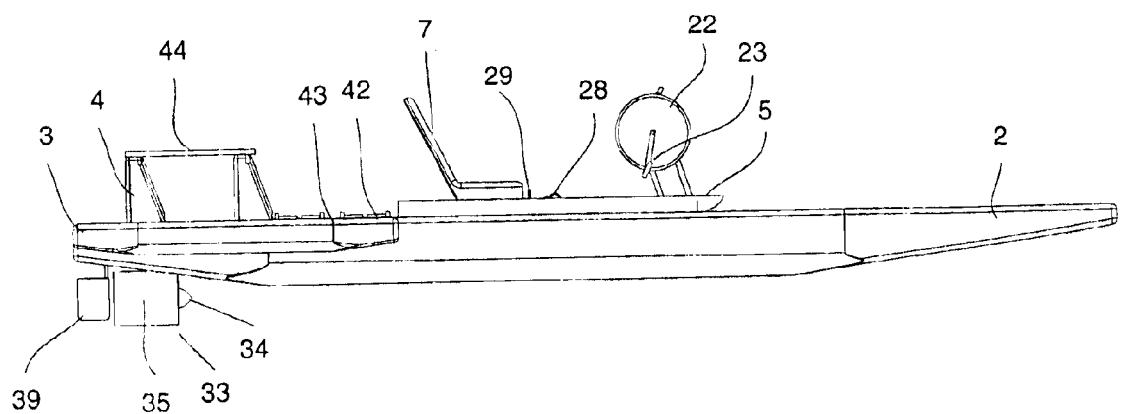
FIG. 3 is a side view of a single-hull embodiment of the watercraft invention for one operator.

FIGS. 1–3 provide various views of the preferred single or mono-hull embodiment of the watercraft invention 1 consisting of a long slender main hull 2 and two small outriggers 3 on each sided connected via attaching members 4. The outriggers 3 provide roll stability to the watercraft, and may be either permanently attached to the main hull via members 4, or detachable to facilitate car top transportation. Furthermore, the lateral spacing of the outriggers 3 may be adjustable to also facilitate transportation. The main hull 2 and outriggers 3 are preferably fabricated of a light-weight laminated composite incorporating fiberglass, carbon fiber, and/or Kevlar, or rotomolded of a polymer material such as high-density polyethylene materials and fabrication methods of the main hull 2 and outriggers 3 are of a conventional nature for light-weight watercraft manufacture, resembling that of kayaks and rowing shells. The beam and length of the main hull is intentionally similar to that of rowing shells; i.e., long and narrow, to minimize the drag of the watercraft, thereby maximize the overall efficiency of the watercraft.

The outrigger-attaching-members 4 may be constructed of similar material as the main hull 2 and outriggers 3, or of a metal such as aluminum or stainless steel. They are preferably hollow and of circular or rectangular cross-section to maximize strength and rigidity and simultaneously minimize weight.

A seat 7 is provided for the watercraft operator. An optional floor pan 5 is connected to the top surface of the watercraft main hull 2 to block wave water from splashing the operator. The pan 5 is constructed of similar material as the main hull 2 and may be fabricated integral with the main hull 2.

Propulsion is accomplished via a stern-mounted propulsion unit 33 comprising of an electric motor 34 directly driving a propeller 38. An optional duct (or shroud) 35 surrounds the motor and propeller to provide protection to the propeller from objects, as well as to protect persons from the propeller. The duct has the additional advantage of improving the propeller efficiency. A rudder 39 is located behind the propeller for steering of the watercraft. Alternatively, the propulsion unit 33 can be rotated along a vertical axis in a controlled manner to provide steering, similar to that of conventional outboard boat engines.

A foot pedal and crank arm assembly 23, similar to that common to bicycles, connects to the shaft of an electric generator 22. The watercraft operator rotates the generator via pedaling. Mechanical (i.e, kinetic) power of the watercraft operator's pedaling action is converted to electrical power via the generator. Though foot pedals 23 are shown, the pedal generator may instead have hand grips and positioned to utilize upper body motion, rather than leg motion.

The generator 22 is preferably a direct-drive permanent-magnet (PM) three-phase AC generator. By eliminating the need for gearing or chains and sprockets, as with conventional pedal-powered watercraft, and other applications such as bicycles, the direct drive nature of the generator simplifies construction and greatly enhances reliability and reduces maintenance requirements. A PM generator is strongly preferred over other types of electric generators such as switched reluctance and induction machines to maximize efficiency and minimize weight. A direct-drive PM generator with high-energy NdFeB magnets designed specifically for this application would have an efficiency range of 88–94% and a weight between 7–14 kg. Compared to a geared generator operating at higher speeds, the direct drive generator is generally larger in size and mass for the same efficiency, and thus attention must be given to the generator design to minimize size, weight, and cost. Such design skill is within the capabilities of an experienced PM motor or generator designer.

In an alternative embodiment, the foot pedal and crank arm assembly 23 instead mounts directly onto a second shaft mounted for rotation and containing a synchronous timing-belt pulley. The generator 22 shaft is similarly fitted with a synchronous timing-belt pulley, though of a smaller size than the crank arm shaft pulley. A synchronous timing-belt connects the generator and crank arm pulleys, such that the generator rotates at a substantially higher speed than the crank arm assembly. A speed ratio of 3:1 to 5:1 is preferred. By rotating the generator at a higher speed, the size, mass, and cost of the generator for the same efficiency can be significantly reduced. In this configuration, a generator efficiency of 94–96% at a rated speed between 300–500 RPM is readily achievable.

Note that the invention, both preferred and alternative embodiments, features an all-electric drive system; i.e., there is no mechanical system linking or transmitting the human pedal power to the propulsion system. Typical watercycles use a noisy, low inertia, mechanical linkage between the pedal shaft and the propeller. The resulting pedaling characteristics tend to be uneven and not fluid, unlike a bicycle. The direct drive and geared generators provide inertia for a smoothing effect; thus making pedaling easier and more enjoyable like riding a bicycle.

Steering control is accomplished through a hand-controlled lever in the control unit 29 located near the seat. Conventional mechanical means consisting of a cable connect the lever mechanism to the rudder, or alternatively, to a swivel mounted propulsion motor. An optional second lever provides the operator with direct control of the propulsion motors to enable operation and control of the watercraft without pedaling, if desired.

A ventilated battery storage and control electronics compartment 43 is mounted internal to the main hull 2. The compartment 43 may also be mounted in any position along the length of the main hull, provided that the weight balance is correct when all components, including the operator, are included. Any number or type of rechargeable batteries 42 may be used. The compartment 43 is depicted with a cover removed to illustrate the batteries 42. In the preferred embodiment, the batteries are 12 volt, deep-cycle, lead-acid batteries with a total capacity of 100–400 Amp-hours (or 1,200–4,800 Watt-hr @12 v) energy storage. Lead-acid batteries are currently the most economical and readily available type of batteries for this amount of energy storage. The deep cycle batteries may be either flooded, gel, or AGM batteries, though flooded batteries are currently preferred. The flooded batteries require ventilation and periodic maintenance, but are of lower cost and weight for the same energy storage capability. In the near future, 42 volt automotive batteries may become commercially available at an economic price, thus providing an alternative voltage.

A disadvantage of the lead-acid batteries is the relatively low energy density; i.e., they are very heavy. Since one of the main design goals of the watercraft is to use light-weight components to maximize speed and travel time, more advanced batteries exhibiting higher energy densities such as NiMH or NiCad may become economically attractive in the next few years. Flywheel energy storage may also be used to augment or replace the batteries as the energy storage means for the watercraft invention. Also, in future embodiments, fuel cells may be used to augment the power generation.

An operator-control unit 28, containing system control electronics, status display, and operator-control functions, is mounted in front of the seat close to the steering control unit 29. From the control unit 28, the operator enables and disables the watercraft electric power, sets the electric generator 22 pedaling torque vs. RPM characteristics, and the power amplification level.

FIGS. 1–3 also illustrate an optional photovoltaic solar panel 44 mounted on top of the outrigger members 4. The photovoltaic solar panel generates electric power that is supplied to the battery storage 42. The photovoltaic solar panel 44 performs several functions:

1.) It automatically recharges the batteries when the watercraft is not in use in an environmental and operator-friendly manner.
2.) It increases the distance the watercraft can travel on a single battery charge, especially during operation on sunny days.
3.) It enables the watercraft to still travel when the batteries are depleted and the operator is not able to (or does not desire to) pedal.
4.) It increases the maximum possible watercraft speed when the batteries are depleted and the operator is pedaling.

The normal operating mode of the watercraft is in a human-power amplification mode, wherein the electric generator power produced by the operator pedaling is electronically amplified and supplied in a controlled manner to the electric propulsion motor unit 33. This propels the watercraft at a speed substantially higher than that obtained solely from human pedal power. In the preferred embodiment, power amplification factors of 4 to 12 times the maximum designed generator power are obtainable resulting in maximum watercraft speeds up to 10 knots. The top watercraft speed is highly dependent upon the specific watercraft hull design and displacement. The energy used to supply the amplified power to the electric propulsion motor unit 33 is obtained from the sum of the human pedal power (via the generator 22), the battery storage 42, and the optional solar panel 44, if present.

Figure 4:
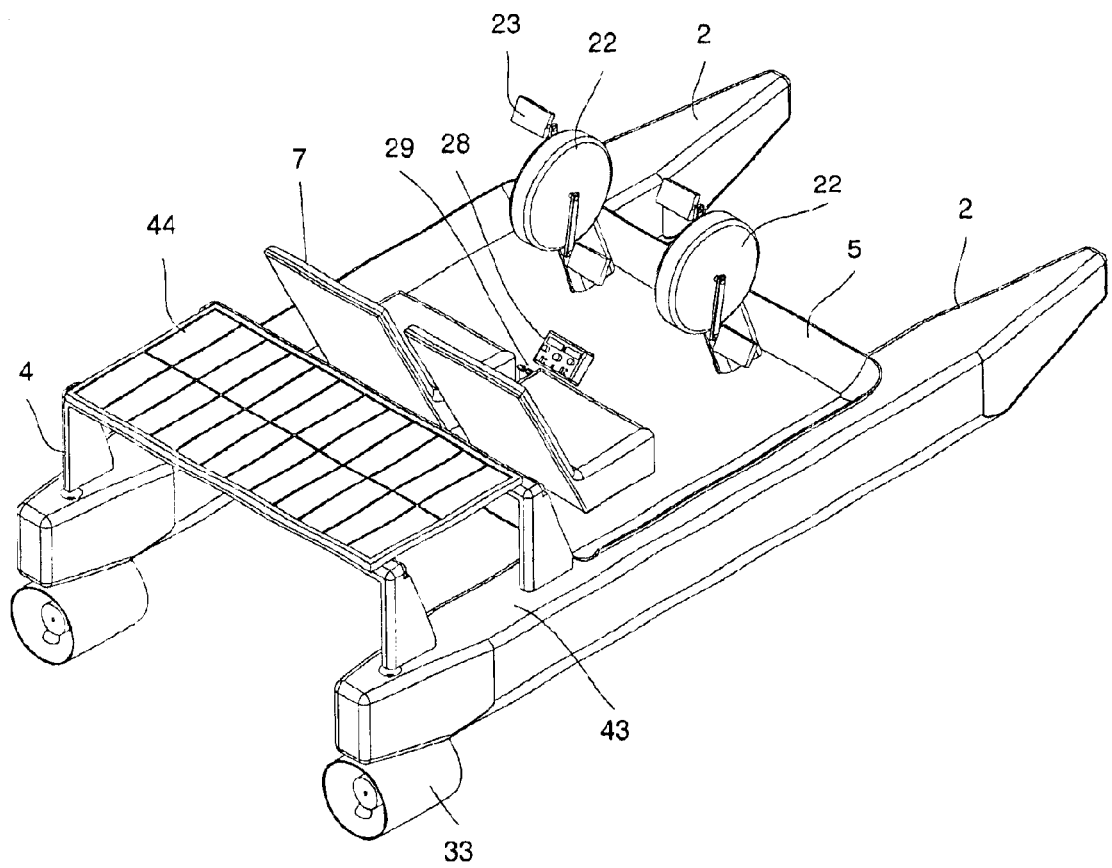
FIG. 4 is rear perspective view of a twin-hull embodiment of the watercraft invention designed for two operators with optional solar panel.

FIG. 4 illustrates a second embodiment of the invention comprising two hulls 2 attached in a catamaran configuration, and designed for two operators pedaling. Two propulsion motor units 33 provide propulsion and steering via individual control of the motor thrusts. Steering can alternatively be accomplished via one or two rudders (not shown) similar to the single-hull embodiment in FIGS. 1–3. A steering control unit 29 is located between the seats. An operator-control unit 28 is similar to the unit 28 for the single-hull embodiment, with the exception that the generator controls are duplicated for the two generators. The optional photovoltaic solar panel 44 performs the same functions as listed above for the single-hull embodiment.

Figure 5:
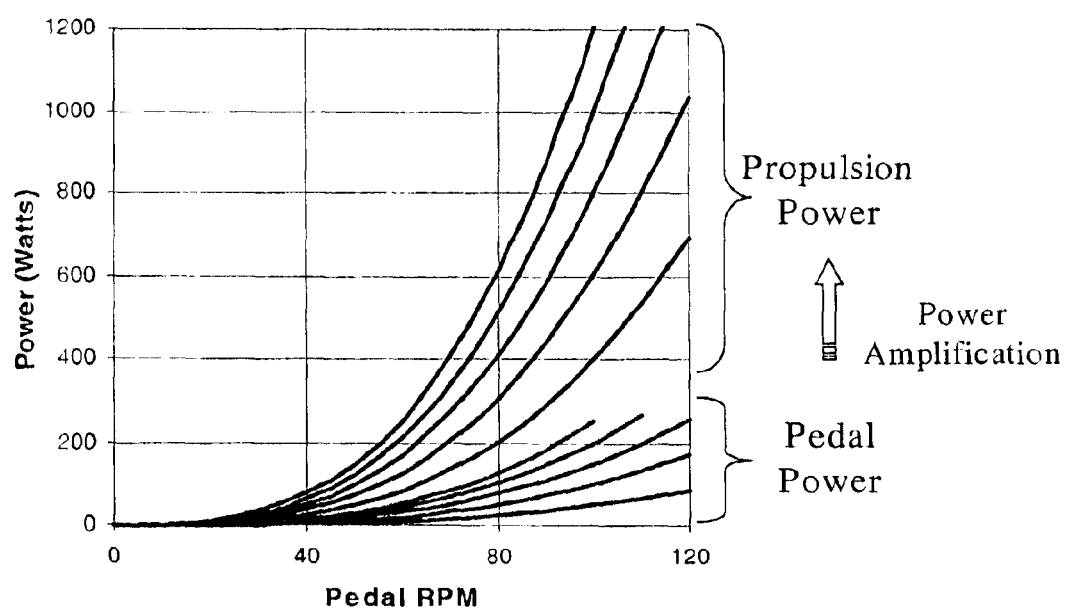
FIG. 5 is a chart illustrating the amplification of human pedal power to propulsion power.

FIG. 5 shows numerous curves of power vs. pedal cadence (RPM), illustrating both the variable electronic gearing and the variable human-power amplification provided by the invention. The curves illustrate possible operating points of both the power output of the electric generator 22 and the power output from the propulsion motor 34 as functions of the pedal cadence (RPM). Note operating points in-between the individual pedal power curves are also valid operating points. Likewise, operating points between the individual propulsion power curves are also valid operating points.

A well-conditioned cyclist is capable of continuously generating approximately 200 watts at an optimal cadence of around 90–100 RPM. The average recreational cyclist, however, would preferably generate considerably less power on a continuous basis. The invention provides the operator with effectively infinite adjustability in both gear ratio and power amplification.

A key innovative feature of the invention is the extensive adjustability of the pedaling characteristics relating the pedal cadence and pedal force (effected through control of the generator speed and torque) to the watercraft propulsion. If desired by the operator, the pedaling characteristics can simulate boat propeller characteristics with a mechanical linkage but with nearly infinitely adjustable gear ratios. Or equivalently, the pedaling characteristics can effectively simulate a single-speed mechanical drive with nearly infinitely variable propeller sizes. A multitude of other pedaling characteristics are possible, some of which are described further.

The propulsion power, and hence propulsion thrust and watercraft speed, is a multiple of the operator's pedal power. In the preferred embodiment, the net power amplification can range from 1 up to 100, with a maximum propulsion power of up to 1600 watts. For example, if an operator was pedaling at a cadence of 90 RPM and generating 200 watts of power, and wished to travel as quickly as possible, then the operator would set a net power amplification factor of 8 to achieve the maximum propulsion power of 1600 watts. Alternatively, if another operator desired to pedal at a cadence of 57 RPM and generate only 50 watts of power, but still travel at the same maximum speed as the other operator, the operator would set a net power amplification factor of 32. This feature enables operators of different cycling capabilities and desires (or training goals) to travel or workout together, either in separate watercraft, or in the same watercraft designed for two operators.

Figure 6:
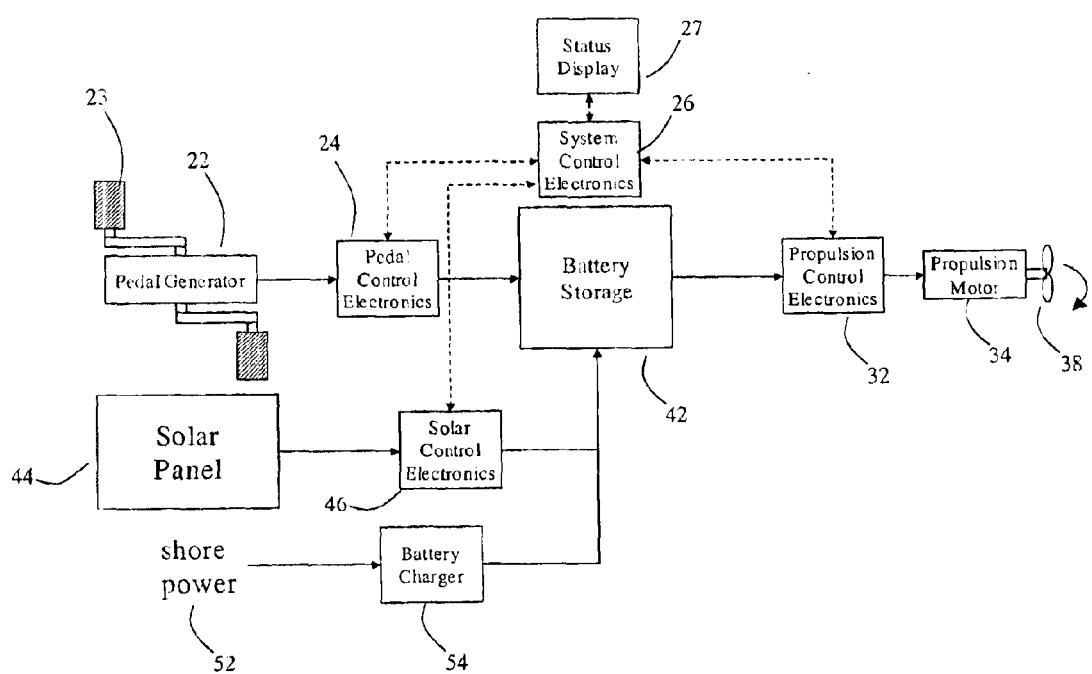
FIG. 6 is a block diagram illustration of the electric system of the embodiment of the invention designed for one operator and with one propulsion motor unit.

FIG. 6 illustrates the electrical power and control systems in a block diagram format for a single-operator watercraft, such as the single-hull embodiment. In the preferred embodiment, the human-powered pedal generator 22 supplies electrical power to a pedal control electronics unit 24. The pedal control electronics 24 regulate and condition the power flow from the pedal generator 22 to the battery storage 42.

The photovoltaic solar panel 44 converts solar power to electrical power. In the preferred embodiment with the currently available technology, the solar panel comprises 100–250 Watts of silicon solar cells, such as the EC-110 module using polycrystalline String Ribbon™ technology manufactured by Evergreen Solar, or the AP-110 using single-crystal silicon cells manufactured by Astropower, Inc. The modules are each rated at 10 Watts and are designed for 12 and 24 volt systems. The two modules weigh 12.2 kg and 11.9 kg, and measure 1585×653×35 mm and 1477×661×35 mm, respectively. The solar conversion efficiency of the modules is believed to be around 10–13%. At least one such module is recommended, although two modules are preferred if sufficient space is available on the watercraft. As photovoltaic technology improves, more efficient and lighter weight solar modules will become available at lower cost, enabling increased photovoltaic power generation from the available space on the watercraft.

A photovoltaic solar control electronics unit 46 regulates and conditions the power flow from the solar panel to the battery storage 42. These units are commercially available, such as the ACS-24/8, 24 volt, 8 amp, charge controller from Specialty Concepts, Inc., or the PVCM10 12/24 volt, 10 amp, charge controller by Atkinson Electronics, Inc.

When docked or on dry land, a shore power connection 52 is used, if desired, to charge the battery storage via a battery charger 54. The shore power connection and the photovoltaic solar panel both provide the necessary recharging of the battery storage. If the watercraft is used often, then the shore power connection is required to ensure rapid and full recharging of the battery storage. If the watercraft is used only seldom, then the photovoltaic solar panel may be adequate to fully recharge the battery storage between operating periods.

The rated system voltage is preferably 24 volts, though other voltages such as 12, 36, 42, and 48 volts are possible. A system voltage at 24 volts is preferred over 12 volts to increase the efficiency of the power electronic units and reduce current loadings, and hence reduce the size of the wires required to carry electric current to and from the battery storage and propulsion motor(s). A 24-volt system is currently preferred over 36 and 48-volt systems due to higher availability of 24 volt electrical components, and higher flexibility in battery connection arrangements. As 42-volt systems become adopted for automotive use, and 42-volt components become readily available, a 42-volt system for this watercraft invention may become a more attractive alternative.

For a current 24-volt system, the battery storage 42 would consist of two 12-volt batteries connected in series, with multiple such units connected in parallel to achieve the desired amount of energy storage. For example, four 75 Amp-hr, 12-volt, flooded, deep-cycle marine batteries connected in a series/parallel combination would provide 300 Amp-hr (or 3600 Watt-hr @ 12 v) over a charging cycle. To preserve battery life, and to account for diminished capacity as the batteries age, the energy storage capacity should be discounted by at least 20%. Thus the four 75 Amp-hr batteries can be assumed to provide only 240 Amp-hr (or 2880 Watt-hr @ 12 volts). The actual amount of stored energy available for propulsion will depend upon the age of the battery and rate of discharge. A high-discharge rate will reduce the amount of available energy. Furthermore, the battery voltage is a function of the discharge rate, and the state of the charge; e.g., a battery is typically considered fully discharged when the no-load battery voltage drops to 10.5 volts. Thus the energy storage metric in Watt-hr is only an approximate measure.

A propulsion control electronics unit 32 regulates and conditions the power flow from the battery storage 42 to the propulsion motors 34. The propulsion motors 34 are directly connected to the propellers 38. A system controller 26 monitors and coordinates the power flow of the pedal generator and the propulsion motor through communication with the pedal control and the propulsion control electronic units, respectively.

In the preferred embodiment, the pedal generator 22 supplies three-phase AC electrical power to the pedal control electronics 24. Three-phase power is preferred over single-phase power because the power flow is constant and maximizes the utilization of conductors in the generator, the wires connecting to and from the generator, and the power electronic devices in the pedal control electronics unit 24.

The preferred generator voltage at a rated pedal cadence of 100RPM is dependent upon the rated system (battery)

voltage and the type of power electronic converter chosen for the pedal control electronics unit 24. With a rated generator voltage designed to be substantially higher than the system voltage (e.g., 100 volts), a simple 3-phase diode bridge rectifier with a buck converter (chopper) would be adequate for the pedal control electronics unit. In this preferred embodiment, the generator would only supply power to the battery and propulsion system when the rectified generator terminal voltage is greater than the 24-volt system voltage. Increasing the rated generator voltage, or decreasing the system voltage, would increase the range of power generation from pedaling. Reduced system voltages could result in a lower efficiency of the pedal control electronics 24, and propulsion electronics, due to increased relative diode and transistor voltage drops. A higher rated generator voltage could increase safety concerns and also would require higher voltage rated transistors and diodes, which may increase the costs. The efficiency may also start to decrease because the duty cycle of the converter would also decrease.

Alternatively, the generator can be designed to have a maximum rated voltage (at maximum cadence) at or below the system voltage; e.g., 24 volts at 120 RPM. In this configuration, a boost converter rather than a buck converter is required. At cadences less than 120 RPM, the generator terminal voltage requires boosting up to 24 volts. The boost converter can be coupled after the 3-phase diode bridge rectifier, or integrated into the bridge rectifier in the form of a Vienna rectifier or an active PWM rectifier utilizing MOSFET or IGBT devices, rather than diodes.

In yet another embodiment, the pedal control electronics unit 24 is configured as a diode bridge rectifier with a current-regulated buck/boost converter, such as a Cuk converter. The buck/boost converter enables power generation from the pedal generator at terminal voltages both below and above the system voltage. This configuration provides the maximum flexibility of the generator and system voltage design. The disadvantage of this configuration is a slightly higher cost compared to the simple buck converter.

The power flow from the pedal generator 22 is controlled by a combination of the generator RPM and the settings of the pedal control electronics unit 24. The system control electronics unit 26 sends a signal representative of a torque command to the pedal control electronics unit 24. For pedaling comfort and ease, the torque command from the system control electronics 26 is an operator-settable function of a torque amplification gain, $K_{amp1}$, and the generator speed; i.e., $$T_{gen}^* = K_{amp1} \cdot f_T(RPM_{gen})$$

where $f_T(RPM_{gen})$ is an operator-settable function of the generator speed. Both the torque amplification gain, $K_{amp1}$, and the speed function $f_T(RPM_{gen})$ are set by the operator. In the preferred embodiment, the speed function is implemented as a mapping function, or look-up table, in a microcontroller in the system control electronics unit 26. Many different mapping function options are available; for example:

| | |
|---|---|
| $f_T(RPM_{gen}) = RPM_{gen}^2$ | simulated mechanical drive to a water propeller |
| $f_T(RPM_{gen}) = RPM_{gen}$ | simple linear function |
| $f_T(RPM_{gen}) = RPM_{gen}^x$ | flexible mapping, where $0 < x < 3$ |

These mapping functions define the load characteristics of the pedal generator.

FIG. 7-A illustrates an example pedal torque vs. pedal cadence squared load characteristic (or equivalently, torque vs. generator RPM squared) that effectively simulates a mechanical drive to a water propeller. Note that in the preferred embodiment with a direct drive generator, the generator speed and torque are equal to the pedal cadence and torque. With this mapping, the pedaling characteristics (and generator load characteristics) would mimic that of a conventional all-mechanical watercycle, with the fundamental, and important, exception being an effective, nearly-infinitely variable, gearing ratio that is set by the operator through the variable gain, $K_{amp1}$. The pedal control electronics 24 limit the maximum generator torque and power to the designed operating limits, which for this example is 24 Nm.

FIG. 7-B illustrates another example mapping that has a linear relationship between pedal torque and pedal cadence (or equivalently, generator RPM). This mapping function provides the benefit of a linearly increasing torque with increasing pedal cadence, unlike the prior mapping function, where the torque increases more rapidly with increasing pedal cadence. With this linear mapping function, the pedaling effort (measured is a function of the pedaling power) increases only as the square of the speed, whereas it increases with the cube of the speed for the prior (squared) mapping function. With the prior mapping function, and as with mechanical drive systems, the required pedaling effort increases tremendously with increasing pedal cadence, resulting in uncomfortable pedaling characteristics, and the need to continuously adjust the gear ratio. With this new linear mapping, the operator can easily vary the pedal cadence without tremendous changes in the pedaling effort. This is a new capability and benefit offered by this invention, that is not possible with prior art mechanical drive systems.

This invention enables complete flexibility in the mapping function. For example, by selecting a mapping with an exponent between one and two, the operator may experience the feel of pedaling a bicycle on a flat terrain, but again with an infinitely variable gearing ratio controlled by the gain $K_{amp1}$.

Numerous other generator torque vs. RPM mapping functions, $f_T(RPM_{gen})$, are also possible to increase the enjoyment of the watercraft invention. For example, the mapping can utilize a square root function; i.e., $$f_T(RPM_{gen}) = \sqrt{RPM_{gen}} \quad \text{—square-root function}$$

In this case, the torque builds rapidly at low cadences, but then increases slowing with increasing pedal cadence.

As another alternative, the mapping can also be varied as a function of time; i.e., $$T_{gen}^* = K_{amp1} \cdot f_T(RPM_{gen}, \text{time})$$

A time-varying scaling factor can be added to change the generator load characteristics to simulate pedaling through effective hills and valleys, much like on a bicycle; e.g., $$f_T(RPM_{gen}) = 1 + K_{hv}[1 + \sin(2\pi f_{hv} t)] \cdot RPM_{gen}^2$$

where t is time, $f_{hv}$ is the frequency of simulated hills, and $K_{hv}$ is the amplitude of the effective hills and valleys. FIG. 8 illustrates the pedal torque as a function of time for two example operating or load points. Curve 101 corresponds to $f_{hv}=0.002$ Hz (500 second period), $K_{hv}=4$, $RPM_{gen}=80$, and $K_{amp1}=0.000391$, and is an example of relatively large slow-changing hills and valleys. Curve 102 corresponds to $f_{hv}=0.008$ Hz (125 second period), $K_{hv}=3$, $RPM_{gen}=80$, and $K_{amp1}=0.0003$, and is an example of smaller faster-changing simulated hills and valleys. Like bicycling actual hills and valleys, the required pedaling effort varies in time with the instantaneous generator torque command. If the operator is able to maintain a constant pedal cadence, the propulsion power will remain constant, and thus the speed of the watercraft will also remain constant, much like pedaling a bicycle. The power generated from the pedaling will vary according to the variation in torque. The operator has complete control of the $f_{hv}$, $K_{hv}$, and $K_{amp1}$, parameters, and thus can make adjustments as desired.

FIG. 9 illustrates the preferred embodiment of the pedal control electronics unit 24 utilizing a three-phase passive (diode) bridge rectifier 61 and a current-regulated buck converter 63. The diode bridge rectifier 61 converts the three-phase AC power from the pedal generator 22 at voltage, $V_{genAC}$, to DC voltage, $V_{genDC}$. The DC power at voltage, $V_{genDC}$, is then regulated via a current-regulated buck converter 63, producing system voltage, $V_{sys}$, and current, $I_{sys\_gen}$. The buck converter 63 is a conventional chopper circuit comprising a capacitor 64 for high-side voltage smoothing and energy storage, a MOSFET 65 operating in a PWM switching mode, a diode 66 for freewheeling current, and an inductor 62 for low-side current smoothing and energy storage. A low-side capacitor is also shown, though not necessarily required. A voltage sensor 68 provides a signal representative of the rectified generator terminal voltage, $V_{genDC}$. The voltage sensor is typically a voltage divider with a simple differential amplifier circuit providing a semi-isolated signal. A current sensor 69 provides a signal representative of the generator current, $I_{genDC}$. The current sensor typically comprises an ultra-low value resistor (e.g., 50 milliohms) with a simple differential amplifier circuit. A current regulator circuit 67 receives the generator current sensor signal and a generator current command signal, $I_{genDC}$, from the system control electronics unit 26. The current regulator circuit contains operational amplifiers and a timing circuit (e.g., IC555) configured to form a PI regulator and PWM generator. The PI regulator attempts to drive the difference in the sensed and commanded generator currents to zero, and sends an effective voltage command to the PWM generator, which in turn, generators PWM gating signals which are supplied to the MOSFET 65. The MOSFET is thus switched in a PWM manner to regulate the generator current as commanded. The preferred switching frequency for this application is between 15–40 kHz, to avoid creating audible acoustic noise, while keeping the switching losses as low as possible. The MOSFET should be chosen to have an internal resistance, $R_{DS(ON)}$, as low as possible to minimize conduction losses. The design of such a current-regulated buck converter is within the scope of an experienced power electronics engineer.

To implement the generator 22 torque vs. RPM mapping functions, $f_T(RPM_{gen})$, some knowledge of the generator torque and speed is required. Rather than obtaining the generator 22 speed directly via a speed sensor, or from the generator terminal (AC-side) voltages and currents, the generator speed in the preferred embodiment is estimated from the sensed voltage and current obtained from the rectifier 61 output (DC side) which is input to the buck converter 63. As an approximation, especially for low-speed, high-efficiency PM generators, which typically have low internal impedance, the internal voltage drops due to the generator resistances and reactances can typically be ignored. In which case, the rectified generator voltage is assumed to be directly proportional to the generator RPM; i.e., $$RPM_{gen} \cong \frac{V_{genDC}}{K_{V_{genDC}}}$$

where $K_{V_{genDC}}$ is the rectified voltage constant of the generator. The generator speed can be more accurately estimated by including some of the generator impedance voltage drop; e.g., $$RPM_{gen} \cong \frac{V_{genDC} - R_{gen\_eff} I_{genDC}}{K_{V_{genDC}}}$$

where $R_{gen\_eff}$ is the effective resistance of the generator as seen from the rectifier output. To improve accuracy even further, the voltage drop due to the generator internal reactance can be included.

Thus by sensing the rectified generator voltage, $V_{genDC}$, and, optionally, the current as well, a signal representative of the generator speed can be detected, and used is an input to the torque vs. speed mapping; i.e., $$f_T(RPM_{gen}) = RPM_{gen}^2 \cong \left(\frac{V_{genDC}}{K_{V_{genDC}}}\right)^2 \quad \text{- simulated mech. driven water propeller}$$

$$f_T(RPM_{gen}) = RPM_{gen} \cong \frac{V_{genDC}}{K_{V_{genDC}}} \quad \text{- simple linear (proportional) function}$$

$$f_T(RPM_{gen}) = RPM_{gen}^x \cong \left(\frac{V_{genDC}}{K_{v_{genDC}}}\right)^x \quad \text{- flexible mapping, where } 0 < x < 3$$

Since direct measurement of the generator torque can be costly, the generator torque also can be estimated by measuring the generator current and voltage; i.e., $$T_{gen} = \frac{I_{genDC} V_{genDC} \eta_{gen}}{\omega_{gen}}$$

where $\omega_{gen}$ is the mechanical speed of the generator in radians/second; i.e., $$\omega_{gen} = \frac{\pi}{30} RPM_{gen}$$

and $\eta_{gen}$ is the estimated efficiency of the generator and rectifier. For a direct drive PM generator, the bulk of the losses will be due to stator winding copper (ohmic) losses, thus the efficiency can be calculated, and the torque equation modified to be:

$$T_{gen} \cong \frac{I_{genDC}(V_{genDC} - R_{gen\_eff} I_{genDC})}{\omega_{gen}}$$

Substitution from the above equations reveals the common DC motor torque equation:

$$T_{gen} \cong \frac{I_{genDC}(K_{V_{genDC}}RPM_{gen})}{\omega_{gen}}$$

$$= \frac{30}{\pi} K_{V_{genDC}} I_{genDC}$$

Note that the torque expression is only approximate, but increases in accuracy for generators with low internal impedances. Thus by regulating the rectified generator current, $I_{genDc}$, via the buck converter 63, the generator torque can be approximately controlled.

Since the measured generator voltage is directly available via low cost sensors, the torque command vs. RPM mapping function can be implemented via an equivalent generator current command vs. generator voltage function. The generator current command is a function of the torque command; i.e., $$I^*_{genDC} = \frac{\pi}{30} \frac{1}{K_{V_{genDC}}} T^*_{gen}$$

and in terns of the mapping function is:

$$I^*_{genDC} = \frac{\pi}{30} \frac{1}{K_{V_{genDC}}} K_{amp1} f_T(RPM_{gen})$$

For the simulated water propeller load characteristics, the mapping function $f_T(RPM_{gen}) = RPM_{gen}^2$ is chosen, resulting in the following generator current command characteristics:

$$I^*_{genDC} = \frac{\pi}{30} \frac{1}{K_{V_{genDC}}} K_{amp1} RPM_{gen}^2 = \frac{\pi}{30} \frac{1}{K_{V_{genDC}}^3} K_{amp1} V_{genDC}$$

For the simple linear load characteristics, the mapping function $f_T(RPM_{gen}) = RPM_{gen}$ is chosen, resulting in the following current command:

$$I^*_{genDC} = \frac{\pi}{30} \frac{1}{K_{V_{genDC}}} K_{amp1} RPM_{gen} = \frac{\pi}{30} \frac{1}{K_{V_{genDC}}^2} K_{amp1} V_{genDC}$$

Note the value of $K_{amp1}$ is adjusted for the different mapping functions.

FIG. 10 illustrates an alternative embodiment of the pedal control electronics unit 24, wherein it is implemented as a torque-controlled (i.e., field-oriented) three-phase active rectifier boost converter 90 that directly converts the three-phase AC generator power to a regulated DC power based upon a torque command. Since this embodiment is configured as a boost converter, the rated maximum generator voltage is to be designed to be equal to or lower than the system voltage; e.g., 24 volts. In this embodiment, the system control electronics unit 26 provides a torque command 97 directly. The torque command 97 is converted to current commands via a torque-to-current computation unit 94 based upon an estimate of the instantaneous generator rotor position, θ, and known generator parameters. A rotor speed and position estimator 95 provides an estimate of the instantaneous generator rotor speed and position based upon measured generator voltages and currents. Current commands, $i_a^*$ and $i_b^*$ are fed to a current control circuit 93 which provides a three-phase active PWM rectifier bridge 91 with device gale switching commands. The PWM rectifier bridge 91 typically would consist of six MOSFET or IGBT switching devices, with associated freewheeling diodes. An estimate of the generator speed 96 is also fed back to the system control electronics unit 26. The design and implementation of such a torque-controlled active rectifier is readily within the scope of someone skilled in the art of PM motor and generator controls. In this embodiment, the generator mapping functions would be implemented using the torque command and estimated generator speed signals directly.

The propulsion motor 34 (ref. FIG. 6) is preferably a PM brushed-DC or brushless-AC or DC motor that directly drives a propeller 38 for propulsion. For simplicity, the motor and propeller unit may be a commercially 12-volt or 24-volt electric trolling motor commonly used during fishing, and suitably adapted to mount to the watercraft. The motor and propeller unit is preferably rated to produce at least 50–130 lbs of thrust, requiring 20–76 amps at 24 volts. As is common with trolling motors, the motor is operated in a submerged position and is thus appropriately sealed from the water environment.

Because the quantity of energy stored by the battery storage 42 (as well as by alternative energy storage or generation systems such as flywheels and fuel cells) is considerably less than the equivalent weight of gasoline, the entire propulsion system and hull must be as efficient as possible. Each component of the electrical system must then be as efficient and lightweight as possible. Most commercially available trolling motors, which are PM brushed DC motors, are designed for lowest cost, rather than maximum efficiency. Typical efficiencies at rated thrust may only be 65–75%. Thus in the preferred embodiment, the propulsion motors are to be designed explicitly for this application to have high efficiency and low mass, within an acceptable cost range. The design of high efficiency, low mass, PM motors typically requires the use of high-energy NdFeB magnets, low-loss steel laminations, and increased armature wire size. Such design skills are within the skill set of an experienced PM motor designer.

In the currently preferred embodiment, the propulsion motor is a brushed-DC PM motor due to the simplicity of the control electronics. Alternatively, the propulsion motor can be a three-phase brushless PM motor. A PM three-phase business motor can be made lighter and more efficient, and generally more reliable, than a brushed DC motor because the (stator) windings and laminated core can be in closer contact with the water environment for improved cooling. Furthermore, space and weight is saved in the motor housing because the brushes and commutator of the brushed-DC motor are not required.

Power to the propulsion motor 34 is controlled by the propulsion control electronics unit 32. The propulsion control electronics unit 32 consists of a two-leg H-bridge PWM DC-DC converter with MOSFET or IGBT devices if the propulsion motor 34 is a brushed-DC motor, and a three-leg PWM H-bridge DC-AC inverter with similar devices if the propulsion motor 34 is a three-phase brushless motor. A conventional H-bridge converter topology enables voltage and current reversal, thereby enabling forward and reverse operation. To maximize efficiency, the rated propulsion motor voltage is preferably also 24 volts, like the system voltage. For efficient cooling of the MOSFET or IGBT devices, the propulsion control electronics can be located within the propulsion motor housing, such that the heat sink of the electronics has good thermal contact with the surrounding water.

The propulsion control of the brushed-DC motor can be either voltage controlled, current-regulated, torque-regulated, or speed regulated, though voltage control is preferred since it is the simplest to implement and is of adequate performance. Though not required, the controller can be implemented digitally using a microcontroller, a DSP, a microprocessor, or a type of programmable gate array. Suitable commercial motor controllers are readily available. These units typically utilize an analog voltage signal input or an external potentiometer setting as a control input to set the output voltage magnitude and polarity. A typical control voltage setting is 0 to 10 volts for full speed RPM, with a separate switch to reverse the sequencing of the H-bridge gating commands, and hence, reverse the output voltage polarity and direction of propeller rotation.

In an alternative embodiment, a buck converter (also commonly referred to as a chopper circuit) is used with a reversing set of contactors. The buck converter is capable of producing voltage of only one polarity, so the reversing contactors are required to switch the polarity of the motor voltage. Variable speed trolling motors comprising a brushed-DC PM motor and a chopper circuit with reversing contactors are also commercially available. These variable-speed trolling motors can be readily adapted to perform the functions of propulsion unit components 32, 34 and 38, although at some possible reduction in efficiency due to potentially lower motor efficiency.

Proper propeller design is also critical for obtaining an efficient propulsion system. The propellers provided with trolling motors typically have a small pitch, often less than 3" per rotation, because they are designed for producing high thrust at very low speeds; e.g., <1–2 knots. Because this watercraft invention is to operate at higher speeds, such as up to 7–10 knots, a trolling motor propeller is not the preferred propeller. The preferred propeller would have a pitch of around 7–9" per rotation, for a propulsion motor with a rated speed of 1400–1600 RPM. The design of the optimal propeller should include propulsion motor design factors such as rated torque and speed. A wide variety of propeller sizes and pitches are commercially available.

The system control electronics unit 26 coordinates the power flow of the pedal control electronics unit 24 and the propulsion control electronics unit 32. The system controller also provides an optional status display 27 to the operators.

FIG. 11 shows a schematic of the system control electronics unit 26 illustrating an implementation of the key functions, along with the remainder of the system. A signal representative of the rectified generator voltage, $V_{genDC}$, (sensed from voltage sensor 68 in FIG. 9) is fed to the system controller via signal wires 71. A potentiometer 72 provides an operator-adjustable attenuated voltage signal that is proportional to the generator voltage, $V_{genDC}$. The potentiometer 72 performs the function of the operator-adjustable $K_{amp1}$ amplification factor. The attenuated voltage signal is then fed into an operator-selected and adjustable mapping function block 74. The mapping function block performs the various $f(RPM_{gen})$ or $f(RPM_{gen}, time)$ functions from the received voltage signal, which is representative of the generator speed (and pedal cadence). The output of 74 is clamped at the maximum voltage signal that the buck converter 63 is designed to receive as an input for full current, typically 10 volts. The output signal is carried via wires 75 to the buck converter where it is received as the generator current command, $I_{genDC}{}^*$. The preferred means of implementing the mapping function is digitally via a microcontroller. A selection of different mapping functions is stored in memory, with the operator selecting the desired mapping function anytime during watercraft operation. The different mapping functions are each scaled to produce the same output signal at the maximum rated load point (e.g., 120 RPM) for the same setting of potentiometer 72 (i.e., the same value of $K_{amp1}$). A/D and D/A converters are used to convert the input signals from analog to digital, and the output signals from digital to analog. In a typical microcontroller, the D/A converter function would be implemented via an internal timer configured to produce a PWM signal proportional to the desired analog signal value. The PWM signal would pass through a low-pass filter on output prior to being received by the buck converter current regulator.

The signal representative of the rectified generator voltage, $V_{genDC}$, is also fed to an operator-adjustable potentiometer 76. The output of the potentiometer is a scaled voltage signal approximately proportional to the generator speed. The potentiometer 76 performs the function of the operator-adjustable $K_{amp2}$ amplification factor. The voltage signal is fed via wires 77 to the propulsion motor drive converter 32. This signal is the voltage command for the propulsion motor converter; i.e., $$V_{motor}^* = K_{amp2} V_{genDC} \cong K_{amp2} \frac{RPM_{gen}}{K_{VgenDC}}$$

The propulsion control electronics unit 32 produces an output voltage that is proportional to the input voltage command, and is supplied to the propulsion motor 34; i.e., $$V_{motor} = K_{conv} V_{motor}^*$$

where $K_{conv}$ is the effective voltage amplification factor of the converter.

Like the generator 22, the propulsion motor 34 is to be designed for high efficiency. Thus the speed of the propulsion motor 34, assuming it is a brushed or brushless-DC motor, will be approximately proportional to the applied motor voltage; i.e., $$RPM_{motor} \cong K_{Vmotor} V_{motor}$$

The motor RPM is thus related to the generator RPM by $$RPM_{motor} \cong \frac{K_{Vmotor} K_{conv}}{K_{VgenDC}} K_{amp2} RPM_{gen}$$

The propeller 38 torque is related to the motor 34 speed by the equation:

$$T_{prop} \cong K_{prop} RPM_{motor}^2$$

and the propeller power is $$P_{prop} \cong T_{prop} \omega_{prop}$$

Neglecting losses in the motor (assuming a high efficiency motor), the motor power and torque are the same as the propeller power and torque; i.e., $$P_{prop} \cong P_{motor}$$

$$T_{prop} \cong T_{motor}$$

Thus the propeller power is also a function of the generator RPM; i.e., $$P_{prop} \cong \frac{\pi}{30} K_{prop} RPM_{motor}^3$$

$$\cong \frac{\pi}{30} K_{prop} \left( \frac{K_{Vmotor} K_{conv}}{K_{VgenDC}} K_{amp2} RPM_{gen} \right)^3$$

The propulsion (propeller) power is thus a function of the generator RPM cubed.

FIG. 12 illustrates the approximate relationship between the generator speed (pedal cadence) and the propulsion power with increasing amplification factors, $K_{amp2}$, for the preferred embodiment. In this embodiment, the propulsion power increases with generator speed and factor $K_{amp2}$ until an example design limit of 1600 Watts is reached. This is the design limit of the example propulsion motor and control electronics. Two example generator load points are illustrated, both at a cadence of 80 RPM. Generator load point 110 is with a low $K_{amp2}$ setting, thus the propulsion power is only approximately 100 Watts. Generator load point 112 is with a much higher $K_{amp2}$ setting, and thus the propulsion power is at its maximum limit of 1600 Watts. Note the power produced by the generator, and hence, the pedaling effort, is controlled by $K_{amp1}$ and the selected mapping function, not $K_{amp2}$, and thus can be the same for both load points.

With displacement hull characteristics, the watercraft speed will be a function of the cube root of the propulsion power; i.e., $$v \cong C_{hull} \left( \frac{\eta_{prop} P_{prop}}{Disp} \right)^{\frac{1}{3}}$$

where $C_{hull}$ is a hull constant, $t_{prop}$ is the efficiency of the propeller, and Disp is the displacement of the hull. The watercraft speed is thus approximately a linear function of the generator RPM; i.e., $$v \cong C_{hull} \left( \frac{\eta_{prop}}{Disp} \frac{\pi}{30} K_{prop} \right)^{\frac{1}{3}} \left( \frac{K_{Vmotor} K_{conv}}{K_{VgenDC}} \right) K_{amp2} RPM_{gen}$$

FIG. 13 illustrates the approximate relationship between watercraft speed, v, and generator speed, $RPM_{gen}$, and propulsion amplification factor, $K_{amp2}$, for an example watercraft with a certain displacement in accordance with this invention. The watercraft speed is approximately linear with generator speed for low values of $K_{amp2}$, and increases with increasing $K_{amp2}$ until a maximum speed is reach corresponding to the example design limit of 1600 Watts of propulsion power. The two example load points, 110 and 112 from FIG. 12, are again labeled to illustrate the resulting differences in watercraft speed. Note these curves are only rough approximations that assume a constant propeller efficiency and hull constant.

The power amplification from the pedal generator to the propulsion motor is now considered. The pedal generator power is simply:

$$P_{gen} \cong T_{gen} \omega_{gen}$$

or $$P_{gen} \cong \frac{\pi}{30} T_{gen} RPM_{gen}$$

In general, the generator torque is set by the mapping function; i.e., $$T_{gen} \cong T_{gen}^* = K_{amp1} \cdot f_T(RPM_{gen}, \text{time})$$

The generator power is then $$P_{gen} = \frac{\pi}{30} K_{amp1} \cdot f_T(RPM_{gen}, \text{time}) RPM_{gen}$$

For the simulated water propeller (i.e., squared) mapping function, the generator torque is approximately:

$$T_{gen} \cong T_{gen}^* = K_{amp1} \cdot RPM_{gen}^2$$

The generator power is then related to the generator speed by:

$$P_{gen} = \frac{\pi}{30} K_{amp1} \cdot RPM_{gen}^3$$

and, from the prior expressions, the propeller power is then related to the generator power by:

$$P_{prop} \cong K_{prop} \left( \frac{K_{Vmotor} K_{conv}}{K_{VgenDC}} K_{amp2} \right)^3 \frac{1}{K_{amp1}} P_{gen}$$

Thus the net pedal-power amplification for the simulated water propeller (i.e., squared) mapping function is a linear function:

$$P_{prop} = K_{ampnet} P_{gen}$$

where the net power amplification gain is:

$$K_{ampnet} \cong K_{prop} \left( \frac{K_{Vmotor} K_{conv}}{K_{VgenDC}} \right)^3 \frac{K_{amp2}^3}{K_{amp1}}$$

Note the operator has control over the $K_{amp1}$ and $K_{amp2}$ gains, and the $f_T(RPM_{gen}, \text{time})$ mapping function. The $K_{amp1}$ gain and the $f_T(RPM_{gen}, \text{time})$ mapping function control the pedal generator torque vs. speed characteristics. They both also have an impact on the net pedal-to-propulsion power amplification. The gain $K_{amp2}$ controls only the pedal-to-propulsion power amplification, and is essentially the gain between the propulsion motor speed and the generator speed (i.e., pedal cadence). For a given pedal generator speed, the propulsion power and resulting watercraft speed will be controlled only by $K_{amp2}$. If the operator changes $K_{amp1}$ or the $f_T(RPM_{gen}, \text{time})$ mapping function, but not $K_{amp2}$, and pedals at the same speed, the propulsion power, and watercraft speed, will remain the same though the generator power and net power amplification would have changed. Assuming power is being discharged from the battery, the allowable travel time would also have changed.

FIG. 14 illustrates the relationship between watercraft speed and generator power over a range of net amplification factors, $K_{ampnet}$, for an example watercraft with the simulated water propeller (i.e., squared) mapping function in accordance with this invention. With a $K_{ampnet}$ set equal to 1, the propulsion power is equal to the generator power, which, at a maximum of 200 Watts, limits the speed of the example watercraft to only 3.4 mph. As $K_{ampnet}$ is increased, the maximum watercraft speed also increases for the same amount of generator power. In this example watercraft, the total propulsion power is limited to 1600 Watts, thus limiting the maximum speed to 6.8 mph for a specific displacement. This speed to power relationship assumes a displacement type hull without planing characteristics. Additional speed increases may be obtainable for the same power levels with improved hull designs offering planing characteristics. These speed and power levels are intended only for illustration purposes. Actual embodiments of the invention may utilize higher power levels and achieve higher watercraft speeds.

Note the above equations assume 100% efficiency for all electrical components including the motor, generator, and power electronic converters. In reality, each component will have losses that will reduce the overall efficiency, and hence output power. It is thus important that all components should be designed with maximum efficiency possible within set cost constraints. Practical efficiency ranges that can be achieved by proper design are: 90–96% for the generator 22 and motor 34, and 94–98% for the pedal control electronics 24 and the propulsion control electronics 32. The net system efficiency range from generator to propulsion motor output is then 71.5% to 88.5%.

To achieve high efficiency, the generators and motors should be permanent magnet machines utilizing high-energy rare-earth magnet materials such as sintered NdFeB with energy products above 40 MGOe. A higher energy product is preferred to maximize efficiency and minimize weight, generally at the expense of increased cost. The major loss component in these PM machines, especially for relatively low speed machines such as the pedal generator, is the stator winding copper loss. To minimize this loss, and thus maximize the efficiency, the machines should be designed for operation with low current density. This is generally achieved by increasing the amount of copper; i.e., increasing the copper area per turn. The high efficiency machines have the added benefit of low cooling requirements. There is generally a tradeoff between increasing efficiency, reducing weight, and reducing cost. An optimization procedure that seeks to maximize efficiency, while minimizing weight and cost, by exploring a wide design space is thus recommended. Such procedures are common practice to experienced motor and generator designers.

The power flow into the propulsion motor 34 is $$P_{motor} = P_{gen} + P_{PV} + P_{battery}$$

where $P_{gen}$ is the power flow generated by the pedal generator 22, $P_{PV}$ is the power flow generated by the optional photovoltaic panel 44, and $P_{battery}$ is the power flow out of the battery 42 that is depleting the stored energy. Under normal operation with power amplification, the motor is drawing more power than the pedal generator and photovoltaic solar panel can generate. If the battery is sufficiently charged, the battery will provide the additional power to the motor as commanded; i.e., $$P_{battery} = P_{motor} - P_{gen} - P_{PV}$$

In this operating mode, the available travel time while maintaining a specific level of power amplification (and resulting watercraft speed) is finite. The available travel time is a function of the available stored energy in the batteries, the propulsion motor power draw, and the power generated by the pedal generator and the photovoltaic panel. Assuming constant rates of power, the maximum available travel time is given by the expression:

$$t_{inex} = \frac{E_{battery}}{P_{battery}} = \frac{E_{battery}}{P_{motor} - P_{gen} - P_{PV}}$$

where $E_{battery}$ is the available stored energy in the batteries. Thus one can see that to maximize the travel time available at a specific power amplification level, the energy storage capacity should be as large as possible, within the watercraft design constraints of weight and cost. Also, the efficiency of the propulsion unit and the pedal generator should also be as high as possible to minimize the propulsion motor power draw required to produce the desired level of thrust, and to maximize the power generated from the human operator. Furthermore, increasing the capacity of the photovoltaic solar panels will also increase the available travel time.

When the stored charge in the battery is depleted to a predetermined level (typically when the no-load voltage reaches 10.5 volts of the individual 12 volt batteries), the motor power is limited to the net power generated by the pedal generator and the photovoltaic panel(s). The power flow out of the battery is thus decreased to zero, thereby preventing further discharging and potential damage to the battery; i.e., $$P_{battery} = 0$$
$$P_{motor} = P_{gen} + P_{PV}$$

This limiting control function is implemented within the system control unit 26. In the preferred embodiment, the battery voltage is sensed, and the state of charge is monitored by the same microcontroller programmed with the mapping functions. When the state of charge depletion reaches a predetermined threshold, the battery current is regulated to zero by controlling the motor voltage command sent to the motor control unit 32. This embodiment requires a sensor to measure the current flow of the battery.

During operation with a depleted battery, the maximum watercraft speed is limited by the net power produced by the pedal generator and the optional photovoltaic panel. With power supplied solely by the pedal generator, the maximum speed for the example watercraft embodiment in FIG. 14 is that given by the $K_{ampnet}=1$ curve. Though the maximum speed is limited, the travel time is indefinite. With the optional photovoltaic panel producing power, some degree of power amplification is possible, such that $K_{ampnet}$ values greater than 1, and thus higher watercraft speeds, are attainable.

One can see that the watercraft invention has numerous possible modes of operation including:
1.) Full amplification mode with maximum speed capability using combined pedal power, battery storage, and optional solar power.
2.) Partial amplification mode with depleted battery storage but enhanced speed capability using combined pedal power and solar power.
3.) Pedal power only with no amplification of power.
4.) Battery power only (no pedaling, propulsion motors directly controlled by operator)
5.) Solar power only (no pedaling or battery storage)

FIG. 15 illustrates the electrical system in block diagram form for a two-operator embodiment of the invention as depicted in FIG. 4, consisting of two pedal generators 22 and two propulsion motors 34, and dual sets of associated control electronics units, 24 and 32. Other configurations such as two pedal generators and one propulsion motor, or one pedal generator and two propulsion motors, are also easily implemented given the appropriate components as identified. For a two-operator system, the battery storage 42 capacity is preferably increased to enable the same or greater travel distance and/or travel time capability. Likewise, the solar panel 44 and associated control electronics units 46 are preferably increased in ratings. Systems for more than two-operators are also easily realizable using the same components.

In the two-operator embodiment featuring two pedal generators, each operator would have individual generator controls including the torque vs. speed load mapping functions and gains $K_{amp1}$. However, they would share a common propulsion gain $K_{amp2}$. Both generator pedal control electronics units 24 would feed their respective sensed voltages, $V_{genDC}$, to the system controller 26. The microcontroller in the system controller would then calculate an average voltage value to create the voltage command, $V_{motor}*$, to the propulsion control electronics unit(s) 32. The system controller would send each pedal generator control electronics unit a unique current (or torque) command, $I_{genDC}*$, calculated by the microcontroller based upon the individual operators' selected mapping functions and gains.

Alternatively, the mapping functions and gain $K_{amp1}$ can be implemented via a microcontroller within each of the pedal control electronics units. In which case, the system controller would simply receive a signal representative of the each generator's speed.

FIGS. 16 and 17 illustrate the preferred embodiments of the operator control interface 80 contained within the operator-control unit 28 (ref. FIG. 1-4), along with the system control electronics unit 26, for the single and two-operator embodiments of the watercraft, respectively. The control interface 80 preferably consists of the following components:

power switch 83 and power indicator LED 88 status display 82 and display selector switch 89 forward/reverse switch 87 pedal power to propulsion power amplification gain adjuster 81 ($K_{amp2}$ potentiometer 76)

pedal generator electronic gear ratio adjuster 84 ($K_{amp1}$ potentiometer 72)

pedal generator torque vs. speed mapping selection switch 85 optional simulated hill-mode mapping characteristic adjusters (potentiometers) 86.

The illustrated control interface provides the operator with three distinct mapping function options; i.e., simulated mechanical propeller, proportional (linear), and hill (and valley) loading characteristics. Additional mapping functions can be readily added.

The operator control interface 80 for the two-operator embodiment illustrated in FIG. 17 has two sets of controls for setting the pedaling characteristics, and two sets of status displays, but a single set of power amplification setting and watercraft power systems adjustments. Preferably, the following information is available to the operator on the status display 82:

watercraft speed in MPH, Knots, or km/hr pedal generator speed in RPM pedal generator torque amount of pedal power being generated amount of solar power being generated amount of propulsion power amount of battery power usage expected battery power operating life amount of propulsion thrust.

These quantities are calculated by the microcontroller located in the system control electronics unit 26.

The invention can be transported via either a trailer, or easily disassembled into components of 50 lbs or less in weight that can then be transported via a combination of car-too carrier and mini-van, pick-up truck, or large car trunk. Since the batteries tend to be heavy, they are easily disconnected and removed from their compartments 43 within the hulls to facilitate lifting and transportation of the hulls.

Steering can be accomplished via several means, including via a conventional rudder, via turning of the propulsion motors much like outboard motors, or via individually controlling the thrust magnitude and direction of the individual propulsion units. For the single-hull watercraft in FIG. 1-3, steering is preferably controlled via a conventional rudder system. In the preferred embodiment for the two-hulled watercraft in FIG. 4 with two propulsion motors, steering is accomplished via individual control of the thrust for each propulsion unit. This eliminates the need for a mechanical linkage system. The microcontroller in the system control electronics unit 26 selectively weights the voltage commands, $V_{motor}*$, that it sends to each of the two propulsion control electronics units 32. For turning left, the voltage command signal sent to the right propulsion unit is greater than the signal sent to the left unit, and vice versa. The net or average voltage command is held constant to maintain the watercraft speed setting. For straight travel, the two voltage command signals are equal. For this embodiment, the steering lever in the steering control unit 29 is connected to a potentiometer with wires connected to an A/D converter channel in the microcontroller of the system control electronics unit. The microcontroller creates the weighting of the voltage commands based upon the relative position of the potentiometer.

Reversing is accomplished by reversing the speed of the propulsion motors via the propulsion electronic controller units 32. This is accomplished by switching the state of reversing contactors if the control unit is implemented as a chopper circuit, or by changing the reference voltage if the control unit is an H-bridge converter. Note that no mechanical transmission is required, unlike conventional outboard engines. The system control electronics unit 26 can be configured such that pedaling in reverse will automatically reverse the motor rotation direction, or preferably, such that simply changing the setting an electrical switch 87 located in the operator control interface 80 from forward to reverse sends a signal to the control electronics to reverse the motor direction.

Note that switches and fuses to disconnect power at various points in the electrical power circuit, especially associated with the battery storage, are needed for safety and convenience but have not been shown for simplicity. The type and location of these components are vital to the usefulness of the invention, but are known to one of standard skills in the art.

Conclusion, Ramifications, and Scope

While the detailed drawings, specific examples, and formulations given describe exemplary embodiments, they serve the purpose of illustration only. The configurations shown and described may differ depending upon on the chosen application and controller and propulsion motor type and implement method. For example, the invention is also applicable to pedal generators and propulsion motors utilizing field-oriented (also known as vector or torque controlled) AC machines such as induction, wound-field synchronous, brushless DC, and PM AC synchronous machines. Furthermore, many of the fine details that would be required to fully design and implement the system components of the invention have not be disclosed here, because such information is readily available in published literature, and is well known to those skilled in the art.

It should be understood that the invention can be embodied with alternative amplification processes and gains. For example, the function of the propulsion amplification gain, $K_{amp2}$, can be generalized to act according to any load point parameter of the pedal generator 22. In addition to the generator speed and voltage, the acceptable load point parameters could also include the generator power, torque, and current, and even the rectified current in the pedal control electronics 24. For example, the propulsion motor voltage command can be made a function of the rectified generator current; i.e., $$V_{motor}^* = K_{amp2} I_{genDC}$$

Although the precise properties of the amplification process will then differ from the preferred embodiment, the fundamental features of the invention will still be retained.

Furthermore, the propulsion control electronics unit 32 can be configured to receive from the system control electronics unit 26 any command signal representative of a desired propulsion unit operating point. Valid command signals include, but are not limited to, motor voltage, current, torque, speed, and propeller thrust.

It should be understood that the invention can be embodied with alternative generator mapping function processes and gains. For example, the mapping function can be reformulated to comprise the desired generator speed as a function of the generator torque, or the desired generator voltage (rectified or un-rectified) as a function of the corresponding generator current.

$$RPM_{gen}^* = K_{amp1} f_T(T_{gen})$$

$$V_{genDC}^* = K_{amp1} f_T(I_{genDC})$$

$$V_{genAC}^* = K_{amp1} f_T(I_{genAC})$$

It should be further understood that the invention can be embodied with alternative configurations of the control electronics units; e.g., the functions of the pedal control electronics unit 24 can be integrated within the system control electronics unit 26. Likewise the functions of the propulsion control electronics unit 32 can be integrated within the system control electronics unit 26. Furthermore, the function of all control electronics units 24, 26, and 32, can be integrated into a single electronics unit.

It should be further understood that the invention can be embodied with virtually any type of watercraft hull design and construction, including planing hulls and monohulls, and even hulls with hydrofoils.

What is claimed is:

1. A watercraft comprising:
   a.) a generation means comprising at least one electric generator that converts human kinetic energy to electrical energy,
   b.) a propulsion means comprising of at least one electric motor and at least one apparatus for converting the motor torque to propelling thrust,
   c.) an energy storage means configured to receive and store electrical energy, and further configured to supply electrical energy to the said electric motor,
   d.) a first control means to control the loading characteristics of the said generator according to an operator-adjustable function of a load point parameter of the generator, and
   e.) a second control means to control the electrical power supplied to the said electric motor as a function of a load point of the said generator.

2. The watercraft of claim 1 wherein the said first control means is arranged to control the loading characteristics of the said generator according to an operator-adjustable function of a load point parameter of the generator and time.

3. The watercraft of claim 1 wherein the first control means is arranged to control the generator torque according to an operator-adjustable function of the generator speed.

4. The watercraft of claim 1 wherein the first control means is arranged to control the generator current according to an operator-adjustable function of the generator voltage.

5. The watercraft of claim 1 wherein the said second control means is arranged to control the electrical power supplied to the said electric motor as a function of a load point of the said generator and an operator adjustment.

6. The watercraft of claim 1 wherein the said second control means is arranged to control the electrical power supplied to the said electric motor as a function of the speed of the said generator and an operator-adjustable gain factor.

7. The watercraft of claim 1 wherein the second control means comprises an electronic circuit configured to receive a signal representative of the desired electronic motor operating point, and the electronic circuit configured to control the electric power supplied to the electric motor as a function of the received signal.

8. The watercraft of claim 1 wherein the energy storage means and the second control means are arranged to supply the said electric motor substantially more electrical power than that produced by the said generator, thereby enabling the propelling of the watercraft at a speed substantially higher than that achievable via the power supplied by the said generator alone.

9. The watercraft of claim 1 wherein the energy storage means is comprised of rechargeable batteries.

10. The watercraft of claim 1 wherein the energy storage means is comprised of a flywheel energy storage system.

11. The watercraft of claim 1, further including a photovoltaic solar panel.

12. The watercraft of claim 1 wherein the said generator produces AC power, and the said first control means comprises an electronic circuit configured to rectify the AC power produced by the said generator to a DC power at a voltage compatible with the said energy storage means, and the electronic circuit further configured to receive a signal representative of a desired amount of power flow from the generator to the said energy storage means and the electronic circuit further configured to control the power flow from the generator to the said energy storage means.

13. A watercraft comprising:
   a.) an energy storage means for storing electrical energy,
   b.) a human-powered generator convening mechanical power to electric power,
   c.) a first electronic circuit configured to condition the electric power produced by the said generator to a DC power at a voltage compatible with the said energy storage means, the first electronic circuit further configured to supply an operating point signal representative of the said generator load operating point, and the first electronic circuit further configured to control the power flow from the generator to the said energy storage means according to a received generator command signal,
   d.) a propulsion unit comprising of at least one electric motor and propeller,
   e.) a second electronic circuit configured to control power flow from the said energy storage means to the said electric motor according to a received motor command signal,
   f.) a third electronic circuit configured to receive the operating point signal supplied by the first electronic circuit, the third electronic circuit further configured to supply the generator command signal to the first electronic circuit according to the received operating point signal and a generator load characteristics function selected by a watercraft operator, and the third electronic circuit further configured to supply the motor command signal to the second electronic circuit according to the received operating point signal and a gain factor selected by the watercraft operator.

14. The watercraft of claim 13 wherein the operating point signal representative of the said generator load operating point is a signal representative of the speed of the said generator.

15. The watercraft of claim 13 wherein the received generator command signal is a signal representative of the desired generator torque.

16. The watercraft of claim 13 wherein the generator load characteristics function of the third electronic circuit is configured as a gain factor.

17. The watercraft of claim 13 wherein the generator load characteristics function of the third electronic circuit is configured as a function of time.

18. The watercraft of claim 13 further including a photovoltaic solar panel configured to supply power to the said energy storage means.

19. The watercraft of claim 13 wherein the energy storage means and the second control means are arranged to supply the said electric motor substantially more electrical power than that produced by the said generator, thereby enabling the propelling of the watercraft at a speed substantially higher than that achievable via the power supplied by the said generator alone.

20. The watercraft of claim 13 wherein the state of charge of the said energy storage means is monitored, and the electric current flowing from the energy storage means is regulated to zero when the state of charge is depleted to a predetermined threshold.

21. A method of powering and controlling a watercraft, comprising:

a.) providing at least one electric generator that converts human kinetic energy to electrical energy, b.) providing at least one electric motor and at least one apparatus for converting the motor torque to propelling thrust, c.) providing an energy storage means and configuring it to receive and store electrical energy, and further configuring it to supply electrical energy to the said electric motor, d.) providing, a means of controlling the loading characteristics of the said generator according to an operator adjustable function of a load point parameter of the said generator, and e.) providing a means of controlling the electrical power supplied to the said electric motor as a function of a load point of the said generator.

22. A watercraft with electric propulsion means, human power means, solar power means, and energy storage means, comprising a power amplification mode of operation wherein a combination of the said energy storage means and the said solar power means is used to amplify the power produced by the said human power means to provide enhanced power capability to the said electric propulsion means and thereby provide enhanced watercraft speed capability.

23. The watercraft of claim 22, further comprising a mode of operation wherein the said energy storage means is used to provide propulsion power without use of the human power means.

24. The watercraft of claim 22, further comprising a mode of operation wherein the said solar power means is used to provide propulsion power without use of the human power means.

25. The watercraft of claim 22, further comprising a mode of operation wherein the said human power means is used to provide propulsion power without removal of energy from the energy storage means.

* * * * *